United States Patent
Nagano

(10) Patent No.: US 7,053,919 B2
(45) Date of Patent: May 30, 2006

(54) OPTICAL DISK APPARATUS OF VARIABLE RECORDING VELOCITY WITH OPTIMUM POWER CONTROL

(75) Inventor: Takashi Nagano, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/315,363

(22) Filed: Dec. 10, 2002

(65) Prior Publication Data

US 2003/0107642 A1 Jun. 12, 2003

(30) Foreign Application Priority Data

Dec. 11, 2001 (JP) .............................. 2001-402642

(51) Int. Cl.
B41J 2/435 (2006.01)
G11B 15/52 (2006.01)

(52) U.S. Cl. .................... 347/236; 347/246; 369/47.53
(58) Field of Classification Search ........ 347/224–225, 347/236, 246; 369/44.29, 44.31, 47.5–47.55, 369/133, 13.24–13.27, 59.14; 702/60

See application file for complete search history.

(56) References Cited

U.S. PATENT DOCUMENTS

| 6,563,775 B1* | 5/2003 | Sato ........................ 369/47.53 |
| 2002/0031060 A1* | 3/2002 | Mashimo et al. ........ 369/44.29 |
| 2003/0036861 A1* | 2/2003 | Matsumoto .................. 702/60 |
| 2003/0043711 A1* | 3/2003 | Mashimo et al. ........ 369/47.39 |
| 2003/0063544 A1* | 4/2003 | Matsumoto .............. 369/59.14 |

* cited by examiner

Primary Examiner—Hai Pham
(74) Attorney, Agent, or Firm—Pillsbury Winthrop Sh. Pittman LLP

(57) ABSTRACT

In an optical recording apparatus, a detecting section detects disk identification information of an optical disk for selecting a constant which relates to the detected disk identification information. A test OPC section performs test writing operation for OPC at a predetermined linear velocity prior to recording of data so as to obtain a test value. A formulating section formulates an equation expressing a target value in function of a recording linear velocity based on the constant, the predetermined linear velocity and the test value. A running OPC section performs running operation of OPC by monitoring an actual value while irradiating a laser beam for the recording of data at the recording linear velocity. A controlling section controls the power of the laser beam such that the monitored actual value coincides with the target value which is determined by the equation with respect to the recording linear velocity.

19 Claims, 12 Drawing Sheets

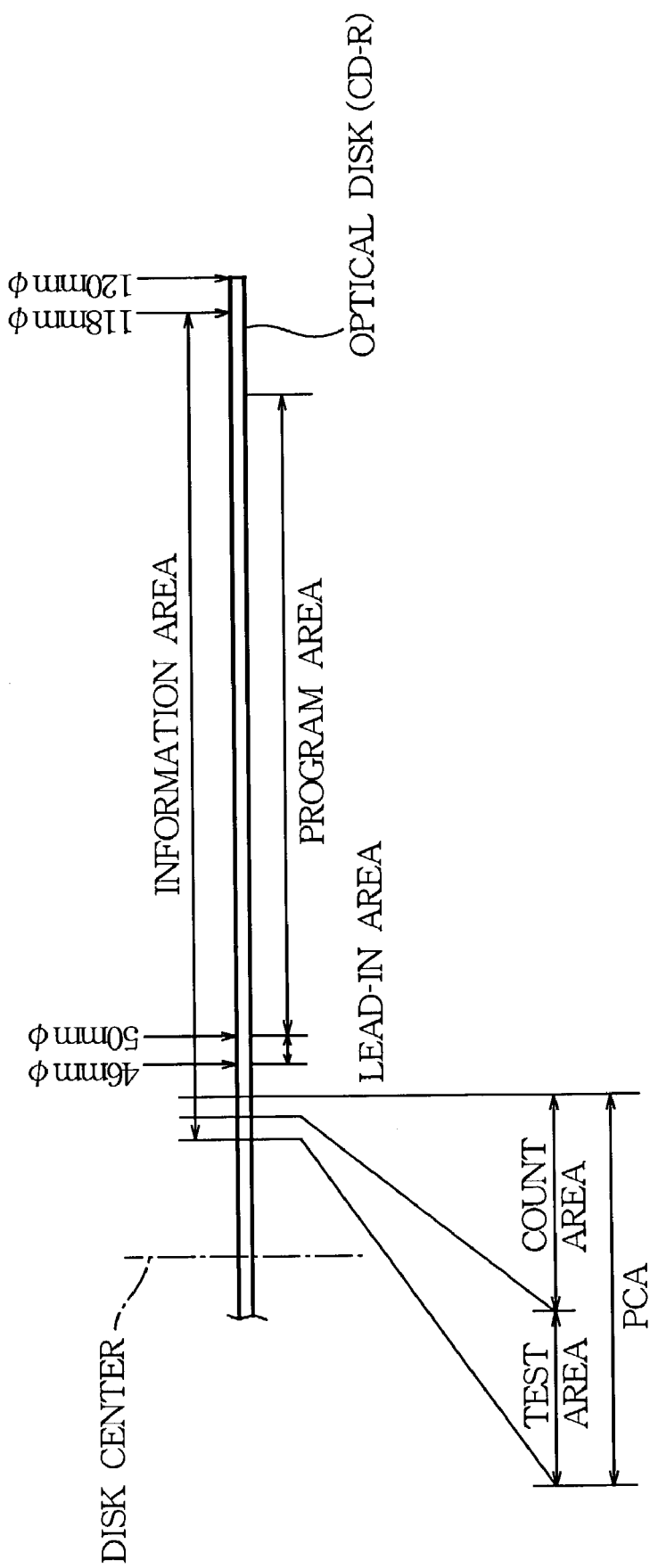

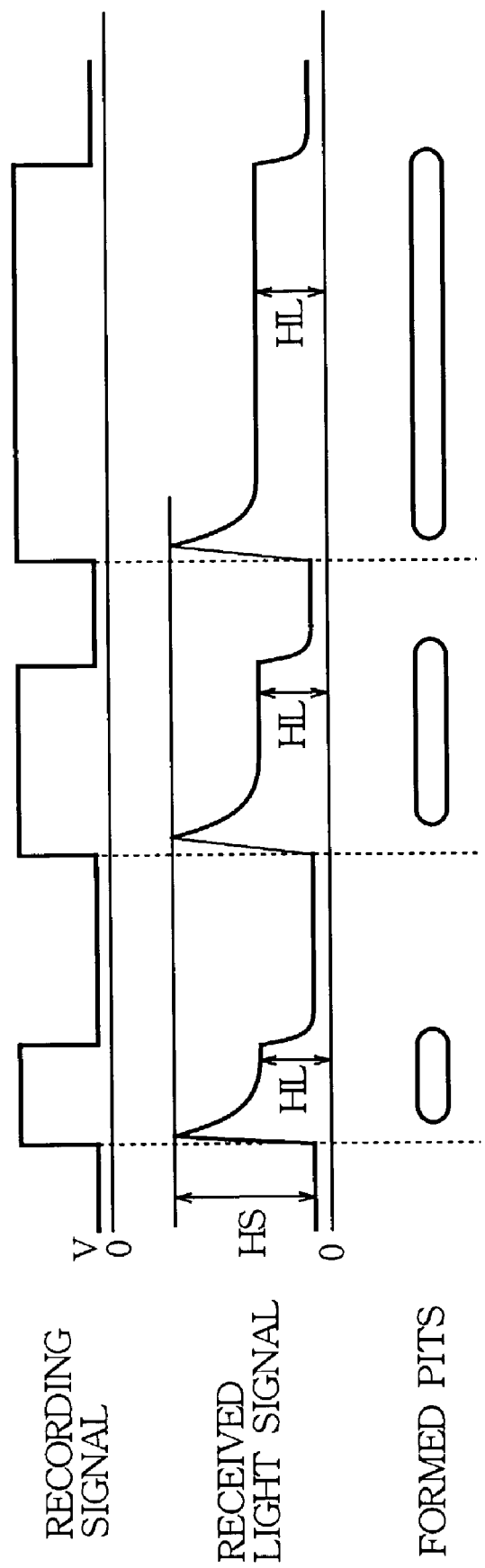

OPTICAL DISK APPARATUS OF VARIABLE RECORDING VELOCITY WITH OPTIMUM POWER CONTROL

BACKGROUND OF THE INVENTION

The present invention relates to a recording method and apparatus for an optical disk capable of writing data.

Conventionally, the CLV (Constant Linear Velocity) method is generally used for recording data on write once optical disks and erasable optical disks capable of recording data. Since the CLV method adopts a constant linear velocity for recording data on optical disks, basically the laser recording power is made constant. The write strategy, a technological method of controlling the laser recording power for accurate data recording for each disk, is fixed if the recording speed is unchanged.

When data is recorded on an optical disk, the data recording power of the laser beam needs to be adjusted because of differences in sensitivity, temperature, and recording environment such as an uneven dye thickness of the disk. Accordingly, the OPC (Optimum Power Control) is applied when data is recorded on a write once optical disk or an erasable optical disk. The OPC method adjusts the laser recording power for recording data on optical disks by irradiating laser beam to perform a test write of a specified pattern in the PCA (Power Calibration Area) of an optical disk.

The following describes an area configuration of CD-R, an example of write once optical disks. FIG. 11 shows a CD-R area configuration. As shown in FIG. 11, an optical disk 11 contains a lead-in area between diameters 46 mm and 50 mm. Outside this area, there are provided a program area and a lead-out area. The PCA is provided toward the inside of the lead-in area. The PCA comprises a test area and a count area. The program area can record digital audio data and computer-based data. The optical disk is 120 mm in diameter and allows recording up to the outside periphery of the lead-out area 118 mm in diameter.

The lead-in area records TOC (Table Of Contents) at the beginning of the optical disk. The TOC contains a list of track start positions. The lead-out area works as a buffer area following the last track on the disk to protect a disk player even if it attempts to read data over the last track. The PCA is a test write area for checking a laser's optimal write power and allows up to 99 test writes. A PMA is an area used for temporarily recording track information when data is written in track-at-once mode.

Before recording data, the OPC is performed to irradiate a laser beam to the PCA provided on the inside periphery of the lead-in area to effect a test write of specified pattern data. The OPC then proceeds to read the written data and finds an optimal power according to a given evaluation criterion, so that data can be actually recorded with the found optimal power.

The test OPC before the data recording is not sufficient for perfectly adjusting the recording power, because of laser wavelength changes and in-plane changes of the disk recording sensitivity during recording. As a solution, running OPC (also referred to as ROPC) is provided in addition to the test OPC. This technique monitors a recording signal waveform during the recording of data and calibrates the recording power so that the recording signal waveform becomes optimal. FIG. 12 shows waveforms corresponding to a recording signal of laser beam for recording and a light signal of the reflected light, and pits formed on an optical disk to record data. When the recording signal is applied as a pulse signal at a specified time interval as shown in FIG. 12, the light signal of the reflected light becomes a peak value HS at the beginning of irradiating the laser beam for recording. When the laser beam just starts being irradiated to the optical disk, no pits are formed on the optical disk and the irradiated light is reflected entirely. After the peak value HS, the amount of reflected light gradually decreases as the pit is formed. The light signal level of the reflected light almost becomes a stable value HL. When the recording signal rises, the light signal of the reflected light also rises.

The above-mentioned waveform characteristics result from the light signal of the reflected light of the laser beam irradiated to the optical disk. Conventionally, the running OPC is performed to control the recording laser beam power by monitoring the light signal waveform so as to constantly stabilize the light receiving signal level, thereby controlling the value HL almost in flat or stable level.

In recent years, an increase of personal computer capacity and user needs accelerates recording speeds (linear velocity scales) of write once optical disks and erasable optical disks. At present, the linear velocity scales according to the CLV method are 16 times for write once optical disks and 10 times for erasable optical disks. The CLV method requires a higher rotational speed on an inner periphery of the optical disk. When the CLV method is used to record data at the linear velocity scale of 12 times, for example, the outermost periphery shows a disk rotational speed of 2400 rpm while the innermost periphery shows a disk rotational speed of approximately 6000 rpm. When the linear velocity scale is set to 16 times, the innermost periphery shows a disk rotational speed of approximately 8000 rpm.

When the CLV method is used to record data on the inside periphery of the optical disk, the disk is subject to a very high rotational speed, causing self vibration to the disk. In such a case, the beam spot size changes in a recording section even if data is recorded on the optical disk with the constant laser recording power. The recorded data may not be read correctly. The disk may be damaged if it is subject to excessive rotational vibration.

When the test OPC or the running OPC is performed with the optical disk vibrated, an inappropriate value is obtained for the optimal power value as the reference for the data recording power. This may create a deficient disk where no data can be read.

Japanese Patent No. 3225704 discloses the technology concerning the optical disk recording method and apparatus for maintaining an appropriate recording state in response to changing conditions during recording on an optical disk. The invention disclosed in this patent forms a pit by irradiating the recording laser beam to the optical disk to write data in terms of the length of the pit. For this purpose, the recording power of the recording laser beam is variably controlled on the basis of a recording power value for the recording laser beam irradiated to the optical disk, and a stable value or its equivalent of the reflected light power in a state where the reflected light power of recording laser beam passes a peak value at the beginning of irradiation and becomes almost stable.

The above-mentioned invention detects, the during data recording, a recording power value HS for recording laser beam irradiated to the optical disk; and a stable value or its equivalent HL for the reflected light power in a state where the reflected light power of recording laser beam passes a peak value at the beginning of irradiation and becomes almost stable, and finds ratio HL/HS. A recording power value of the irradiated laser beam is variably controlled so that the ratio becomes a predetermined optimal value based on an experiment or the like. Since the recording power is appropriately controlled at each time point, an optimal recording state is stably obtained.

The above-mentioned problem can be solved by keeping a low rotational speed on the inside periphery when data is recorded on the optical disk. The CAV (Constant Angular Velocity) method does this. The CAV method provides an almost constant rotational speed (angular speed) and causes a lower linear velocity on the inside periphery compared to the outside periphery. For example, the CAV method enables the linear velocity scale of 30 times on the outermost periphery and 12 times on the innermost periphery. This method changes the linear velocity scale depending on a radial position of the recording laser beam irradiated on the optical disk in the radial direction. Since the CAV method always keeps the number of disk rotations constant, however, it can provide stable writing by suppressing a rotational speed on the inside periphery.

Since the CAV method increases the linear velocity scale toward the outermost periphery of the optical disk as mentioned above, the recording laser beam power needs to be changed according to positions on the optical disk in the radial direction. When the running OPC is performed, the optimal power value obtained by the test OPC can be only applicable to some areas on the inside periphery of the optical disk.

Since the above-mentioned Japanese Patent No. 3225704 shows no reference to changes of the linear velocity scale, it is supposed to disclose the technology according to the CLV method. Accordingly, the technology disclosed in this patent cannot be applied to the CAV method.

Conventionally, the CAV method does not perform the running OPC, because there has not been available an appropriate control method of changing an optimal power value dependently on the linear velocity scale.

SUMMARY OF THE INVENTION

The present invention has been made in consideration of the foregoing. It is therefore an object of the present invention to provide an optical disk recording method and an optical disk recording apparatus capable of recording data on write once optical disks and erasable optical disks by using an optimal power value in the CAV method.

The present invention has the following configurations as means for solving the above-mentioned problems.

(1) There is provided a method of recording data on an optical disk by irradiating a laser beam to form pits while optimally controlling a power of the laser beam based on a value obtained by operation of Optimum Power Control, the method comprising the steps of reading a disk identification information prerecorded on the optical disk for selecting a constant which relates to the disk identification information, performing a test writing operation for Optimum Power Control at a predetermined linear velocity prior to data recording so as to obtain a test value, formulating an equation expressing a target value in function of a recording linear velocity based on the constant relating to the disk identification information, the predetermined linear velocity and the test value obtained by the test writing operation, performing running operation of Optimum Power Control by monitoring an actual value while irradiating the laser beam for the recording of data at the recording linear velocity, and controlling the power of the laser beam such that the monitored actual value coincides with the target value which is determined by the equation with respect to the recording linear velocity.

According to this configuration, a relational expression is created to formulate the equation between a linear velocity scale and a target value for execution of running OPC from a predetermined constant relating to an optical disk for recording data, the constant being predetermined correspondingly to identification information about the recorded optical disk, and a value obtained by performing OPC. Recording power of the recording laser beam is controlled in accordance with the linear velocity scale during data recording so that an observed value obtained by performing the running OPC becomes the target value computed by the relational expression.

Accordingly, it is possible to accurately control the laser beam's recording power despite a change of the linear velocity scale. Though the running OPC has been only available with the CLV method conventionally, the present invention enables the CAV method to perform the running OPC and control the laser beam power, and can record data with an optimal power value and high recording quality. Further, a entire zone between the inside periphery and the outside periphery on an optical disk for recording data nay be divided into a plurality of areas. On each area, it becomes possible to perform the running OPC even by means of the recording method that uses a specified linear velocity scale for recording and to control the recording laser beam's recording power.

(2) There is provided the optical recording method, wherein the step of performing test writing operation obtains the test value represented by a ratio of a flat level and a peak level of the power both being measured during the test writing operation for Optimum Power Control, and the step of performing running operation obtains the actual value represented by a ratio of a flat level and a peak level of the power both being measured during the running operation of Optimum Power Control, the peak level representing a maximum power of the laser beam reflected back from the optical disk and observed at the start of forming the pit, and the flat level representing a stable power of the laser beam reflected back from the optical disk and observed after the start of forming the pit.

This configuration creates the relational expression between a linear velocity scale and a target value from a power ratio of stable light to peak light expressed by a ratio in terms of a peak value or equivalent value of reflected light power of the recording laser beam at the beginning of irradiation and a flat value or equivalent value of reflected light power of the recording laser beam in an almost stable state after the peak value or equivalent value, whereby the peak value and the flat value are obtained by performing OPC with a specified linear velocity scale; from a predetermined constant relating to optical disk identification information recorded on an optical disk; and from the specified linear velocity scale. Recording power of the recording laser beam is controlled in accordance with the linear velocity scale during the data recording so that the power ratio of stable light to peak light obtained by performing running OPC becomes the target value computed by the relational expression. Therefore, if the optical disk state changes, the present invention can accurately and safely control the laser beam's recording power.

A recording power value can be used as an equivalent to the peak value for the reflected light power from the optical disk when irradiation of the recording laser beam starts. Further, it is possible to use a directive value or a detected value for the recording power as the recording power value. The same applies to a value equivalent to the peak value in the following description.

As a value equivalent to the reflected light power's flat value, it is possible to use a reflected light power value immediately before the recording signal falls, or a reflected light power value at a given timing after the recording signal rises and the reflected light power is expected to almost become stable. Alternatively, it is also possible to actually detect changing states of the reflected light power, and detect and use a reflected light power value after detection of a stable state in some degree. The same applies to a value equivalent to the flat value in the following description. (3) There is provided a method of recording data on an optical disk by irradiating a laser beam to form pits while optimally controlling a power of the laser beam based on a value obtained by operation of Optimum Power Control, the method comprising the steps of reading identification information prerecorded on the optical disk for selecting a constant a which relates to the disk identification information, performing a test writing operation of Optimum Power Control at a predetermined linear velocity V1 prior to data recording so as to obtain a test value represented by a ratio of a flat level HL1 and a peak level HS1 of the power both being measured during the test writing operation for Optimum Power Control, the peak level HS1 representing a maximum power of the laser beam reflected back from the optical disk and observed at the start of irradiating the laser beam, and the flat level representing a stable power of the laser beam reflected back from the optical disk and observed after the start of irradiating the laser beam, calculating another constant b based on a relation $HL1/HS1=a*V1+b$ using the constant a relating to the disk identification information, the predetermined linear velocity V1 and the test value HL1/HS1 obtained by the test writing operation, formulating an equation $HL/HS=a*V+b$, which expresses a target value HL/HS in function of a recording linear velocity V, performing running operation of Optimum Power Control to monitor an actual value while irradiating the laser beam for the recording of data at the recording linear velocity V, and controlling the power of the laser beam such that the monitored actual value coincides with the target value HL/HS which is computed by the equation $HL/HS=a*V+b$ with respect to the recording linear velocity V.

In this configuration, the present inventive method finds an intercept value b from the power ratio of stable light to peak light HL1/HS1, the specified linear velocity scale V1, and the constant a corresponding to the identification information read from the optical disk, and creates the relational expression between the variable linear velocity scale V and the power ratio of stable light to peak light HL/HS as a target value during execution of the running OPC. During the data recording, the present invention controls a recording power value of the recording laser beam in accordance with the linear velocity scale so that an observed value of the power ratio of stable light to peak light obtained by execution of the running OPC converges to the target value HL/HS computed by the relational expression.

Depending on disk states, there may be a case of recording unreadable data even if the recording laser beam power is controlled based on a stable value (flat value) or equivalent value for the recording laser beam's reflected light power when this reflected light power at the beginning of irradiation passes the peak value and reaches an almost stable state. Since the present invention controls the recording laser beam power based on a power ratio of stable light to peak light HL/HS in proportion to the linear velocity scale V, it is possible to stably record data even if the linear velocity scale or a disk state changes.

(4) There is provided a method of recording data on an optical disk by irradiating a laser beam to form pits while optimally controlling a power of the laser beam based on a value obtained by test writing operation for Optimum Power Control, the method comprising the steps of performing first test writing operation for Optimum Power Control at a first linear velocity prior to the recording of data so as to obtain a first test value, performing second test writing operation for Optimum Power Control at a second linear velocity prior to the recording of data so as to obtain a second test value, formulating an equation expressing a target value in function of a recording linear velocity based on the first linear velocity, the second linear velocity, the first test value and the second test value, performing running operation of Optimum Power Control to monitor an actual value while irradiating the laser beam for the recording of data at the recording linear velocity, and controlling the power of the laser beam such that the monitored actual value coincides with the target value which is determined by the equation with respect to the recording linear velocity.

In this configuration, the present inventive method creates a relational expression between a linear velocity scale and a target value for execution of the running OPC from a first test write value obtained by performing the first OPC in a first test write area with a first linear velocity scale, a second test write value obtained by performing the second OPC in a second test write area with a second linear velocity scale, the first linear velocity scale, and the second linear velocity scale. During data recording, the present inventive method controls a recording power value of the recording laser beam in accordance with the linear velocity scale so that an observed value obtained by performing the running OPC becomes the target value computed by the relational expression.

Accordingly, it is possible to accurately control the laser's recording power in accordance with a write speed or an optical disk state without predetermining a constant correspondingly to the identification information.

(5) There is provided the optical recording method wherein the step of performing first test operation obtains the first test value represented by a ratio of a flat level and a peak level of the power both being measured during the first test operation of Optimum Power Control, the step of performing second test operation obtains the second test value represented by a ratio of a flat level and a peak level of the power both being measured during the second test operation of Optimum Power Control, and the step of performing running operation obtains the actual value represented by a ratio of a flat level and a peak level of the power both being measured during the running operation of Optimum Power Control, the peak level representing a maximum power of the laser beam reflected back from the optical disk and observed at the start of forming the pit, and the flat level representing a stable power of the laser beam reflected back from the optical disk and observed after the start of forming the pit.

In this configuration, the present invention uses a peak value or equivalent value of the recording laser beam's reflected light power at the beginning of irradiation, a flat value or equivalent value of the recording laser beam's reflected light power in an almost stable state after that peak value or equivalent value, and a power ratio of stable light to peak light expressed by a ratio in terms of the peak value and the flat value. These values are used as a first test write value, a second test write value, and an observed value. In this manner, the present invention creates a relational expression between the linear velocity scale and the target value for performing the running OPC and provides control responsive to the linear velocity scale for the recording laser beam's recording power value. Consequently, it is possible to control the power more safely than a method of using the power function.

(6) There is provided a method of recording data on an optical disk by irradiating a laser beam to form pits while optimally controlling a power of the laser beam based on a value obtained by operation of Optimum Power Control, the method comprising the steps of performing first test writing operation for Optimum Power Control at a first linear velocity V1 prior to the recording of data so as to obtain a first test value represented by a ratio of a flat level HL1 and a peak level HS1 of the power both being measured during the first test writing operation for Optimum Power Control, the peak level representing a maximum power of the laser beam reflected back from the optical disk and observed at the start of irradiating the laser beam, and the flat level representing a stable power of the laser beam reflected back from the optical disk and observed after the start of irradiating the laser beam, performing second test writing operation for Optimum Power Control at a second linear velocity V2 prior to the recording of data so as to obtain a second test value represented by a ratio of a flat level HL2 and a peak level HS2 of the power both being measured during the second test writing operation for Optimum Power Control, calculating constants a and b based on a first relation HL1/HS1=a*V1+b derived from the first test writing operation and a second relation HL2/HS2=a*V2+b derived from the second test writing operation, formulating an equation HL/HS=a*V+b using the calculated constants a and b, the equation expressing a target value HL/HS in function of a recording linear velocity V, performing running operation of Optimum Power Control by monitoring an actual value while irradiating the laser beam for the recording of data at the recording linear velocity V, and controlling the power of the laser beam such that the monitored actual value coincides with the target value HL/HS which is determined by the equation HL/HS=a*V+b with respect to the recording linear velocity V.

In this configuration, the present inventive method finds a coefficient value a and an intercept value b from a first power ratio of stable light to peak light HL1/HS1, a second power ratio of stable light to peak light HL2/HS2, the first linear velocity scale V1, and the second linear velocity scale V2. Then, the present inventive method creates a relational expression determining the relation between the variable linear velocity scale V and a power ratio of stable light to peak light HL/HS as a target value during execution of the running OPC. During the data recording, the present inventive method controls the recording laser beam's recording power value in accordance with the linear velocity scale so that an observed or actual value of the power ratio of stable light to peak light obtained by performing the running OPC becomes a target value HL/HS computed by the relational expression.

Accordingly, it becomes possible to control the laser beam's recording power in accordance with write speeds or optical disk states. The present invention eliminates the need for storing a constant that is predetermined correspondingly to the optical disk's identification information, thereby reducing the memory area.

(7) There is provided the optical recording method further comprising the step of determining the target value HL/HS by the equation HL/HS=a*V+b at anytime the recording linear velocity V changes in accordance with a radial position of the laser beam irradiated on to the optical disk.

In this configuration, the present inventive method records data on an optical disk by changing the linear velocity scale in accordance with a position in a radial direction for irradiating a recording laser beam onto the optical disk. Accordingly, the present invention can configure a target value of all available linear velocity scales based on the relational expression. Though the running OPC has been only available with the CLV method conventionally, the present invention enables the CAV method, the Partial CAV method, and the Zone CLV method to perform the running OPC.

(8) There is provided an optical recording apparatus comprising a rotating section that rotates an optical disk bearing disk identification information thereof, an irradiating section that irradiates a laser beam onto the rotated optical disk to form pits for recording of data, while a power of the laser beam is optimally controlled based on a value obtained by operation of Optimum Power Control, a detecting section that detects the disk identification information for selecting a constant which relates to the detected disk identification information, a test OPC section that performs test writing operation for Optimum Power Control at a predetermined linear velocity prior to the recording of data so as to obtain a test value, a formulating section that formulates an equation expressing a target value in function of a recording linear velocity based on the constant relating to the disk identification information, the predetermined linear velocity and the test value obtained by Optimum Power Control, a running OPC section that performs running operation of Optimum Power Control to monitor an actual value while irradiating the laser beam for the recording of data at the recording linear velocity, and a controlling section that controls the power of the laser beam such that the monitored actual value coincides with the target value which is determined by the equation with respect to the recording linear velocity.

In the optical disk recording apparatus according to this configuration, the formulating section creates a relational expression of a target value in accordance with the linear velocity scale for execution of the running OPC by using optical disk identification information detected by the detecting section and recorded on the optical disk, a test write value obtained by performing the OPC with a specified linear velocity scale, an optical disk's linear velocity scale, and a predetermined constant relating to the optical disk identification information stored by storage means. The laser beam power controlling section controls the recording laser beam's recording power in accordance with the linear velocity scale so that the observed value detected after execution of the running OPC becomes the target value computed by the relational expression. Consequently, the same effect as the configuration (1) can be provided.

(9) There is provided the optical recording apparatus wherein the test OPC section obtains the test value represented by a ratio of a flat level and a peak level of the power both being measured during the test writing operation for Optimum Power Control, and the running OPC section obtains the actual value represented by a ratio of a flat level and a peak level of the power both being measured during the running operation of Optimum Power Control, the peak level representing a maximum power of the laser beam reflected back from the optical disk and observed at the start of forming the pit, and the flat level representing a stable power of the laser beam reflected back from the optical disk and observed after the start of forming the pit.

The optical disk recording apparatus according to this configuration provides a power ratio of stable light to peak light expressed as a ratio in terms of a peak value or equivalent value detected for the recording laser beam's reflected light power at the beginning of irradiation and a flat value or equivalent value detected for the recording laser beam's reflected light power in an almost stable state after the peak value or equivalent value. The formulating section uses the power ratio as a test write value for creating the relational expression. The laser beam power controlling section uses the power ratio as an observed value for controlling the recording laser beam's recording power. Consequently, the same effect as the configuration (2) can be provided.

(10) There is provided an optical recording apparatus comprising a rotating section that rotates an optical disk bearing disk identification information thereof, an irradiating section that irradiates a laser beam onto the rotated optical disk to form pits for recording of data, while a power of the laser beam is optimally controlled based on a value obtained by operation of Optimum Power Control, a detecting section that detects disk identification information for selecting a constant a which relates to the detected disk identification information, a test OPC section that performs test writing operation for Optimum Power Control at a predetermined linear velocity V1 prior to the recording of data so as to obtain a test value represented by a ratio of a flat level HL1 and a peak level HS1 of the power both being measured during the test writing operation of Optimum Power Control, the peak level HS1 representing a maximum power of the laser beam reflected back from the optical disk and observed at the start of irradiating the laser beam, and the flat level representing a stable power of the laser beam reflected back from the optical disk and observed after the start of irradiating the laser beam, a calculating section that calculates another constant b based on a relation $HL1/HS1=a*V1+b$ using the constant a relating to the disk identification information, the predetermined linear velocity V1 and the test value HL1/HS1 obtained by the test writing operation, a formulating section that formulates an equation $HL/HS=a*V+b$, which expresses a target value HL/HS in function of a recording linear velocity V, a running OPC section that performs running operation of Optimum Power Control by monitoring an actual value while irradiating the laser beam for the recording of data at the recording linear velocity V, and a controlling section that controls the power of the laser beam such that the monitored actual value coincides with the target value HL/HS which is computed by the equation $HL/HS=a*V+b$ with respect to the recording linear velocity V.

The optical disk recording apparatus according to this configuration finds the intercept value b from the power ratio of stable light to peak light HL1/HS1, the specified linear velocity scale V1, and the predetermined constant a corresponding to the identification information read from the optical disk, and creates the relational expression between the variable linear velocity scale V and the power ratio of stable light to peak light HL/HS as a target value during the running OPC execution. During the data recording, the optical disk recording apparatus controls the recording laser beam's recording power value in accordance with the linear velocity scale so that the observed value for the power ratio of stable light to peak light becomes the target value HL/HS computed by the relational expression. Consequently, the same effect as the configuration (3) can be provided. (11) There is provided an optical recording apparatus comprising a rotating section that rotates an optical disk, an irradiating section that irradiates a laser beam onto the rotated optical disk to form pits for recording of data, while a power of the laser beam is optimally controlled based on a value obtained by operation of Optimum Power Control, a first OPC section that performs first test writing operation for Optimum Power Control at a first linear velocity prior to the recording of data so as to obtain a first test value, a second OPC section that performs second test writing operation of Optimum Power Control at a second linear velocity prior to the recording of data so as to obtain a second test value, a formulating section that formulates an equation expressing a target value in function of a recording linear velocity based on the first linear velocity, the second linear velocity, the first test value and the second test value, a running OPC section that performs running operation of Optimum Power Control by monitoring an actual value while irradiating the laser beam for the recording of data at the recording linear velocity, and a controlling section that controls the power of the laser beam such that the monitored actual value coincides with the target value which is determined by the equation with respect to the recording linear velocity.

In this configuration, the optical disk recording apparatus creates the relational expression between the linear velocity scale and the target value for performing the running OPC from the first test write value obtained by performing the OPC in the first test write area with a first linear velocity scale, the second test write value obtained by performing the OPC in the second test write area with a second linear velocity scale, the first linear velocity scale, and the second linear velocity scale. During the data recording, the optical disk recording apparatus controls the recording laser beam's recording power value in accordance with the linear velocity scale so that an observed value obtained by performing the running OPC becomes the target value computed by the relational expression. Consequently, the same effect as the configuration (4) can be provided.

(12) There is provided the optical recording apparatus wherein the first OPC section obtains the first test value represented by a ratio of a flat level and a peak level of the power both being measured during the first test writing operation for Optimum Power Control, the second OPC section obtains the second test value represented by a ratio of a flat level and a peak level of the power both being measured during the second test writing operation for Optimum Power Control, and the running OPC section obtains the actual value represented by a ratio of a flat level and a peak level of the power both being measured during the running operation of Optimum Power Control, the peak level representing a maximum power of the laser beam reflected back from the optical disk and observed at the start of forming the pit, and the flat level representing a stable power of the laser beam reflected back from the optical disk and observed after the start of forming the pit.

In this configuration, the optical disk recording apparatus uses a peak value or equivalent value for the recording laser beam's reflected light power at the beginning of irradiation, a stable value or equivalent value for the recording laser beam's reflected light power in an almost stable state after the peak value or equivalent value, and a power ratio of stable light to peak light expressed by a ratio in terms of the peak value and the stable value. These values are used as a first test write value, a second test write value, and an observed value. In this manner, the optical disk recording apparatus creates a relational expression between the linear velocity scale and the target value for performing the running OPC and provides control responsive to the linear velocity scale for the recording laser beam's recording power value. Consequently, the same effect as the configuration (4) can be provided.

(13) There is provided an optical recording apparatus comprising a rotating section that rotates an optical disk, an irradiating section that irradiates a laser beam onto the rotated optical disk to form pits for recording of data, while a power of the laser beam is optimally controlled based on a value obtained by operation of Optimum Power Control, a first test OPC section that performs first test writing operation for Optimum Power Control at a first linear velocity V1 prior to the recording of data so as to obtain a first test value represented by a ratio of a flat level HL1 and a peak level HS1 of the power both being measured during the first test writing operation for Optimum Power Control, the peak level representing a maximum power of the laser beam reflected back from the optical disk and observed at the start of irradiating the laser beam, and the flat level representing a stable power of the laser beam reflected back from the optical disk and observed after the start of irradiating the laser beam, a second test OPC section that performs second test writing operation for Optimum Power Control at a second linear velocity V2 prior to the recording of data so as to obtain a second test value represented by a ratio of a flat level HL2 and a peak level HS2 of the power both being measured during the second test writing operation for Optimum Power Control, a calculating section that calculates constants a and b based on a first relation HL1/HS1=a*V1+b derived from the first test writing operation and a second relation HL2/HS2=a*V2+b derived from the second test writing operation, a formulating section that formulates an equation HL/HS=a*V+b using the calculated constants a and b, the equation expressing a target value HL/HS in function of a recording linear velocity V, a running OPC section that performs running operation of Optimum Power Control by monitoring an actual value while irradiating the laser beam for the recording of data at the recording linear velocity V, and a controlling section that controls the power of the laser beam such that the monitored actual value coincides with the target value HL/HS which is determined by the equation HL/HS=a*V+b with respect to the recording linear velocity V.

In this configuration, the optical disk recording apparatus finds a coefficient value a and an intercept value b from a first power ratio of stable light to peak light HL1/HS1, a second power ratio of stable light to peak light HL2/HS2, the first linear velocity scale V1, and the second linear velocity scale V2. Then, the optical disk recording apparatus creates the relational expression defining the relation between the variable linear velocity scale V and the power ratio of stable light to peak light HL/HS as a target value during execution of the running OPC. During the data recording, the optical disk recording apparatus controls the recording laser beam's recording power value in accordance with the linear velocity scale so that an observed value for the power ratio of stable light to peak light obtained by performing the running OPC converges to a target value HL/HS computed by the relational expression. Consequently, the same effect as the configuration (6) can be provided.

(14) There is provided the optical recording apparatus further comprising a changing section that changes the target value HL/HS determined by the equation HL/HS=a*V+b at anytime the recording linear velocity V changes in accordance with a radial position of the laser beam irradiated onto the optical disk.

In this configuration, the optical disk recording apparatus records data by changing the linear velocity scale in accordance with a position in a radial direction for irradiating the recording laser beam onto an optical disk. Consequently, the same effect as the configuration (7) can be provided.

BRIEF DESCRIPTION OF THE DRAWINGS

FIG. 11 shows area configuration of CD-R.

FIG. 12 illustrates waveforms of a recording signal and a light signal of reflected light, and pits formed on an optical disk to record data.

DETAILED DESCRIPTION OF THE INVENTION

First Embodiment

The inventors of the application concerned examined and experimented a method of recording data on write once optical disks and erasable optical disks with an optimal power value in the CAV method.

First, the inventors examined the relationship between a β value and a jitter value. It is well known that the β value is a readily measurable parameter for the reproduced signal quality and is used as an alternative to the asymmetry value. The β value is expressed as $$\beta = AVG[(|A|-|B|)/(|A|+|B|)]$$

where A is the peak level of a reproduction EFM signal waveform and B is the bottom level thereof. It is also well known that the jitter value numerically represents a scattering time variation between the leading and trailing edges of a given pit or land on the optical disk. For example, the jitter value indicates an allowable time variation when a 3T pit fluctuates like 2.9T or 3.2T. Accordingly, the smaller a jitter value is, the more uniform each pit length becomes, providing higher recording quality.

Figure 1:
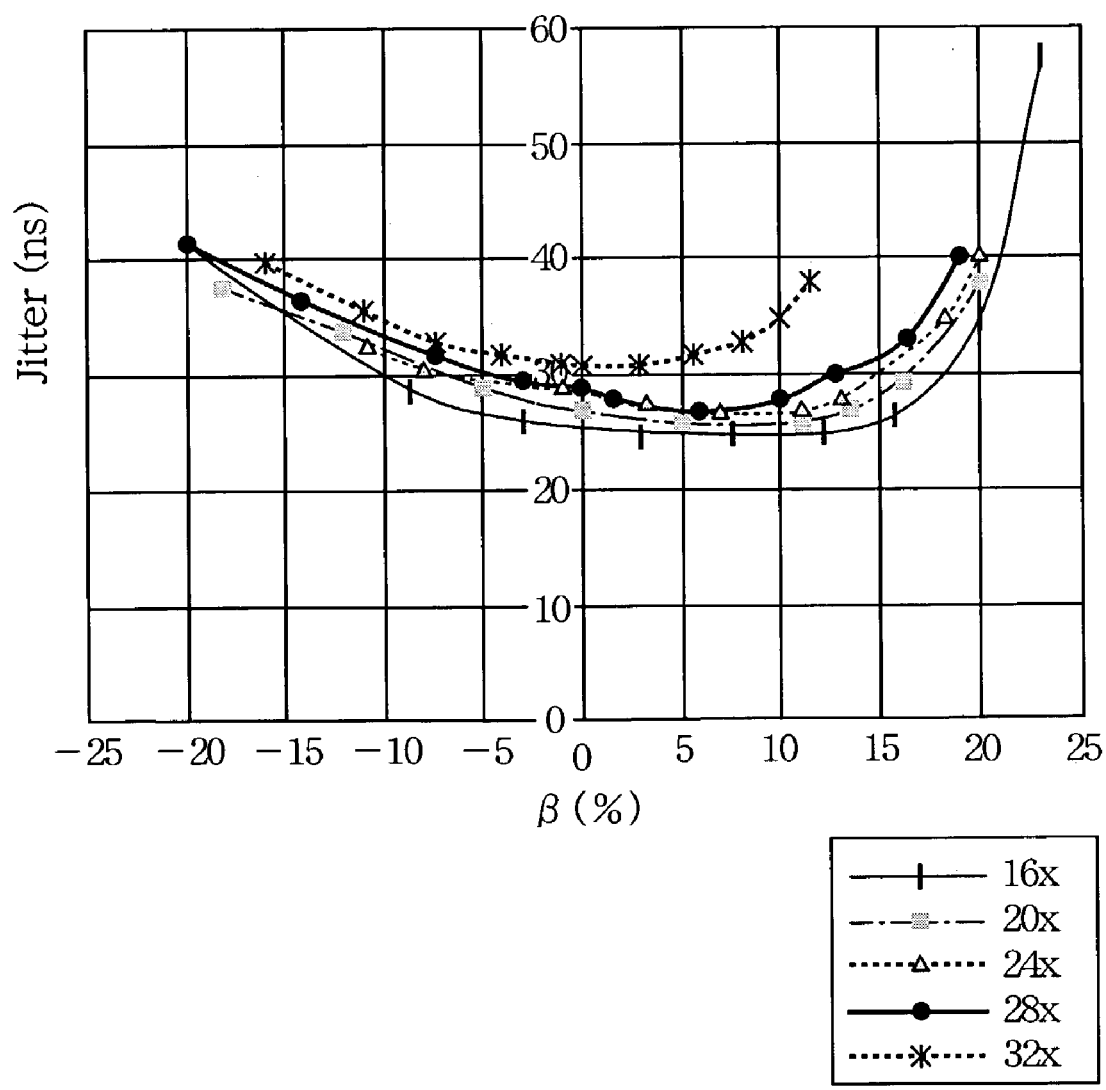
FIG. 1 is a graph showing relationship between a β value and a jitter value while linear velocity scales are denoted as parameters.

FIG. 1 is a graph showing relationship between a β value and a jitter value according to the linear velocity scale as a parameter. FIG. 1 shows that increasing the linear velocity scale deteriorates the jitter value and decreases the β value.

Figure 2:
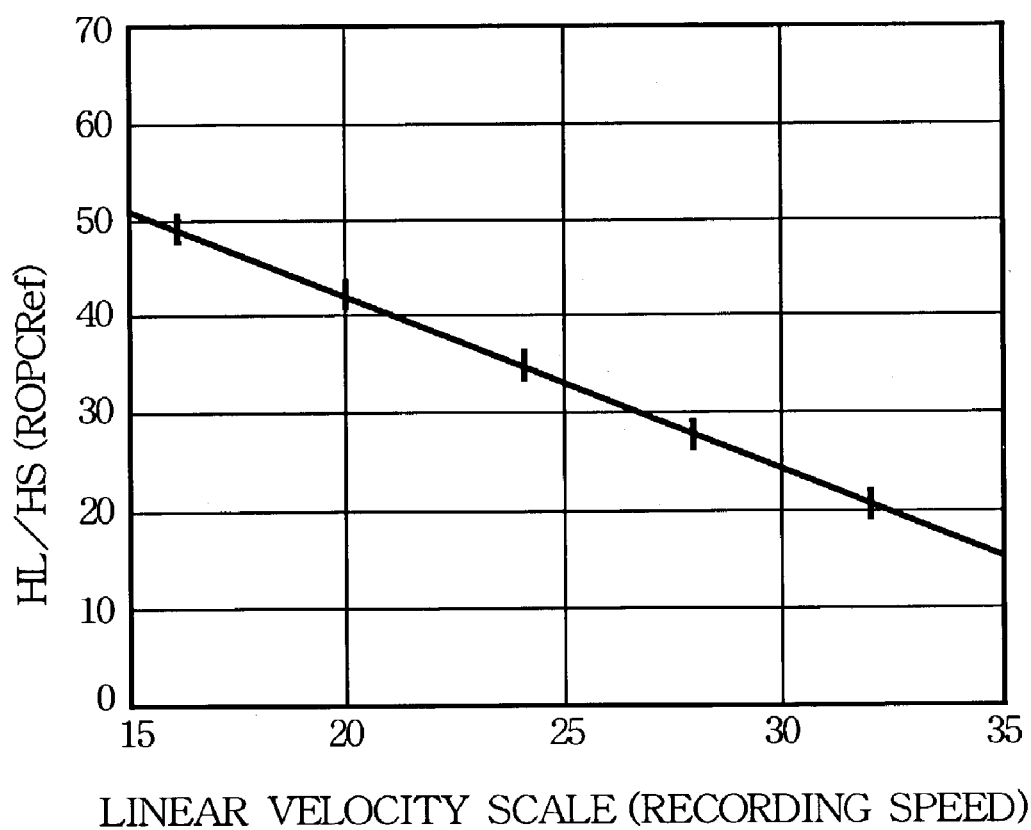
FIG. 2 is a graph showing relationship between a linear velocity scale (recording speed) and a power ratio of stable light to peak light HL/HS.

We investigated the relationship shown in FIG. 1. At a point where a jitter value becomes minimal (best value) in the graph of β and jitter values, we settled a peak value HS for the reflected light power of a recording laser beam at the beginning of irradiation. Further, we settled a stable value HL for the reflected light power of a recording laser beam in an almost stable state after that peak value HS. We examined the relationship between a power ratio of stable light to peak light expressed as HL/HS and each linear velocity scale. FIG. 2 is a graph showing the relationship between the linear velocity scale (recording speed) and the power ratio of stable light to peak light HL/HS causing an optimal jitter value. As a result, we found linear relationship between the linear velocity scale and the power ratio of stable light to peak light HL/HS (ROPCRef) as shown in FIG. 2. We also found that data can be recorded successfully by controlling the laser beam power during data recording based on this relationship.

Figure 3:
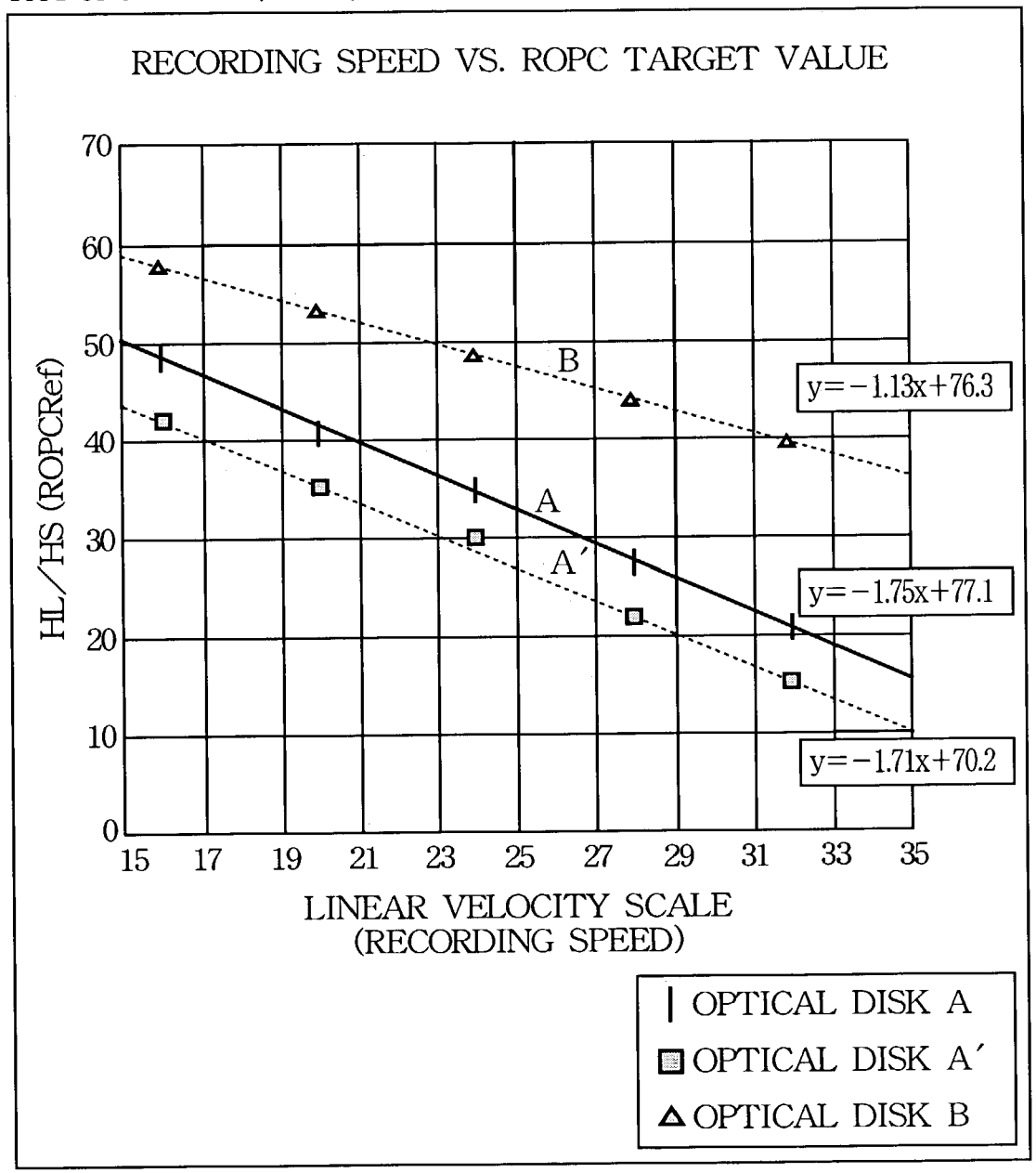
FIG. 3 is a graph showing relationship between a linear velocity scale (recording speed) and a power ratio of stable light to peak light HL/HS (ROPC target value) using optical disk types as parameters.

The inventors made a further experiment and collected data to investigate the relationship between the linear velocity scale and the power ratio of stable light to peak light HL/HS (ROPCRef) with respect to a plurality of write once optical disks and erasable optical disks. FIG. 3 shows an example of the results. FIG. 3 is a graph showing relationship between the linear velocity scale (recording speed) and the power ratio of stable light to peak light HL/HS (ROPC target value) using optical disk types as parameters. The inventors experimented on a plurality of write once optical disks and erasable optical disks. For simplicity of discussion, however, FIG. 3 representatively shows data of an optical disk A, an optical disk B, and an optical disk A' with a different lot from the optical disk A.

The experiment result revealed the following:

1. Linear approximation can be attributed to the relationship between the linear velocity scale (recording speed) V and the power ratio of stable light to peak light HL/HS on each optical disk. That is to say, a linear function can be used to formulate a relational expression between the linear velocity scale V and the power ratio of stable light to peak light HL/HS.

2. The linear function gradient depends on an optical disk type.

3. A different lot of the same types of optical disks changes the intercept value for the linear function, but maintains almost the same gradient value.

4. It is possible to successfully reproduce data that is recorded by controlling the laser beam power during data recording based on the relationship in paragraph 1 above.

In FIG. 3, each optical disk's linear velocity scale (recording speed) V is represented as x; and the power ratio of stable light to peak light HL/HS as y. For example, the following results show the relationship between V and HL/HS.

Optical disk A: HL/HS=−1.75V+77.1
Optical disk A': HL/HS=−1.71V+70.2
Optical disk B: HL/HS=−1.13V+76.3

Figure 4:
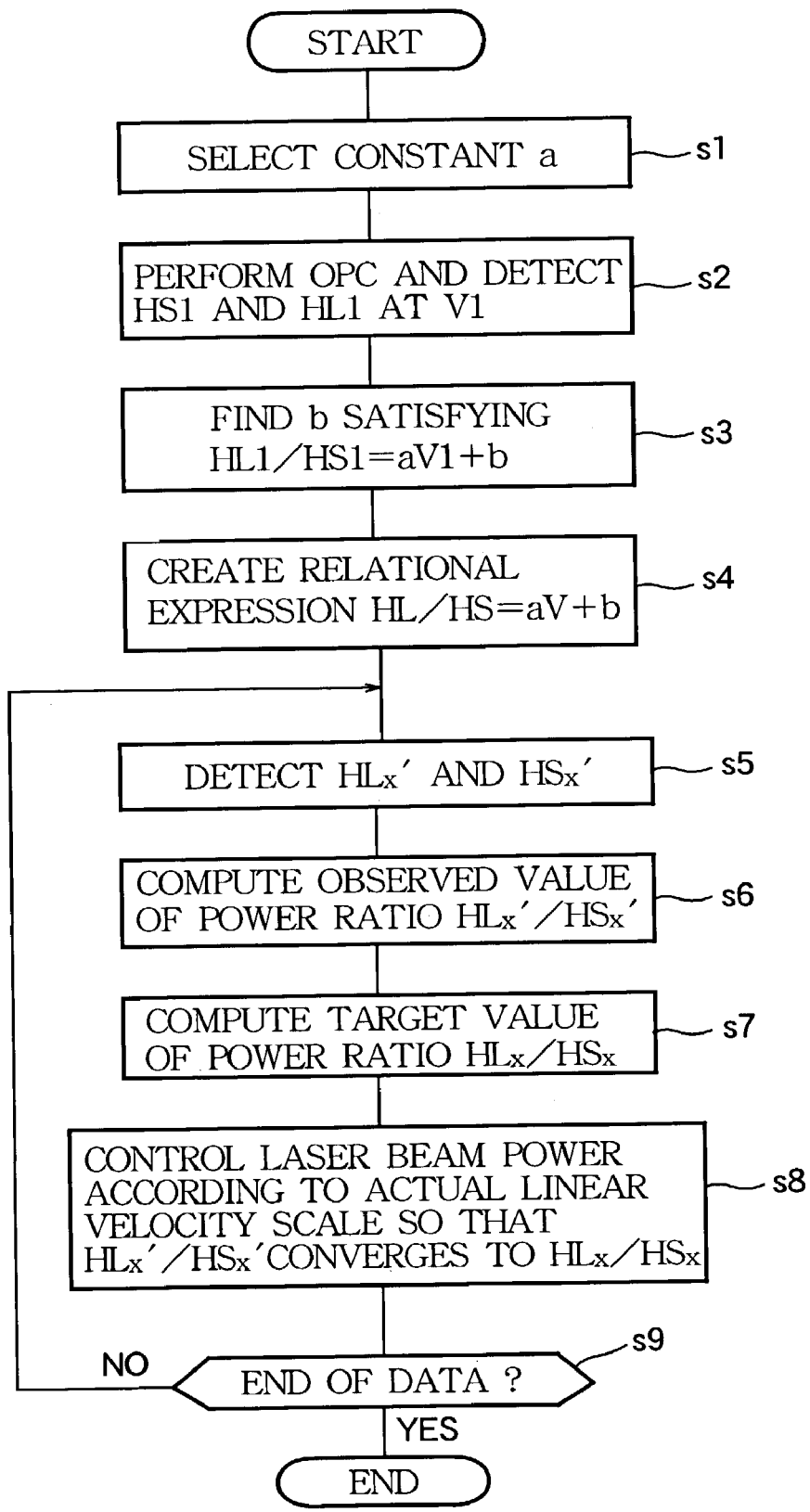
FIG. 4 is a flowchart for explaining an optical disk recording method according to a first embodiment of the present invention.

FIG. 4 is a flowchart explaining the optical disk recording method according to the first embodiment of the present invention. Based on the above-mentioned results, the first embodiment of the present invention can use the CAV method to successfully record data on write once optical disks and erasable optical disks with an optimal power value by conducting the following method:

1. Set a constant (coefficient) a by carrying out an experiment or the like correspondingly to the optical disk's identification information recorded on the optical disk (s1).

2. Perform the OPC on an optical disk for recording data with a specified linear velocity scale V1 to detect a peak value HS1 for reflected light power of the recording laser beam at the beginning of irradiation; and a stable value or equivalent value HL1 for reflected light power of the recording laser beam in an almost stable state after the peak value (s2).

3. Using the power ratio of stable light to peak light HL1/HS1 represented as a ratio of the detected HL1 to HS1, the specified linear velocity scale V1, and the constant a corresponding to the identification information read from the optical disk, find an intercept value b to satisfy the operational expression (s3):

$$HL1/HS1 = aV1+b$$

4. Use the above-mentioned values to create the following relational expression between any linear velocity scale V and the power ratio of stable light to peak light HL/HS as a target value during execution of the running OPC (s4).

$$HL/HS = aV+b \qquad \text{Eq. 1}$$

5. Perform the running OPC when recording data on the optical disk to detect an observed value $HL_x'$ as the peak value for the reflected light power of a recording laser beam and an observed value $HS_x'$ as the stable value for the reflected light power of the recording laser beam in an almost stable state after that peak value (s5).

6. Compute the power ratio of stable light to peak light $HL_x'/HS_x'$ as the ratio of the detected stable value to the detected peak value (s6).

7. According to the above-mentioned relational expression (Eq. 1), compute the power ratio of stable light to peak light $HL_x/HS_x$ when the linear velocity scale is $V_x$ (s7).

8. Control the recording power value of the recording laser beam according to the linear velocity scale so that the observed value $HL_x'/HS_x'$ for the power ratio of stable light to peak light becomes the target value $HL_x/HS_x$ computed by the above-mentioned relational expression (s8).

9. Repeat the steps S5 through S8 while the data to be recorded on the optical disk run, or terminate the process when the data to be recorded on the optical disk run out (s9).

Figure 5:
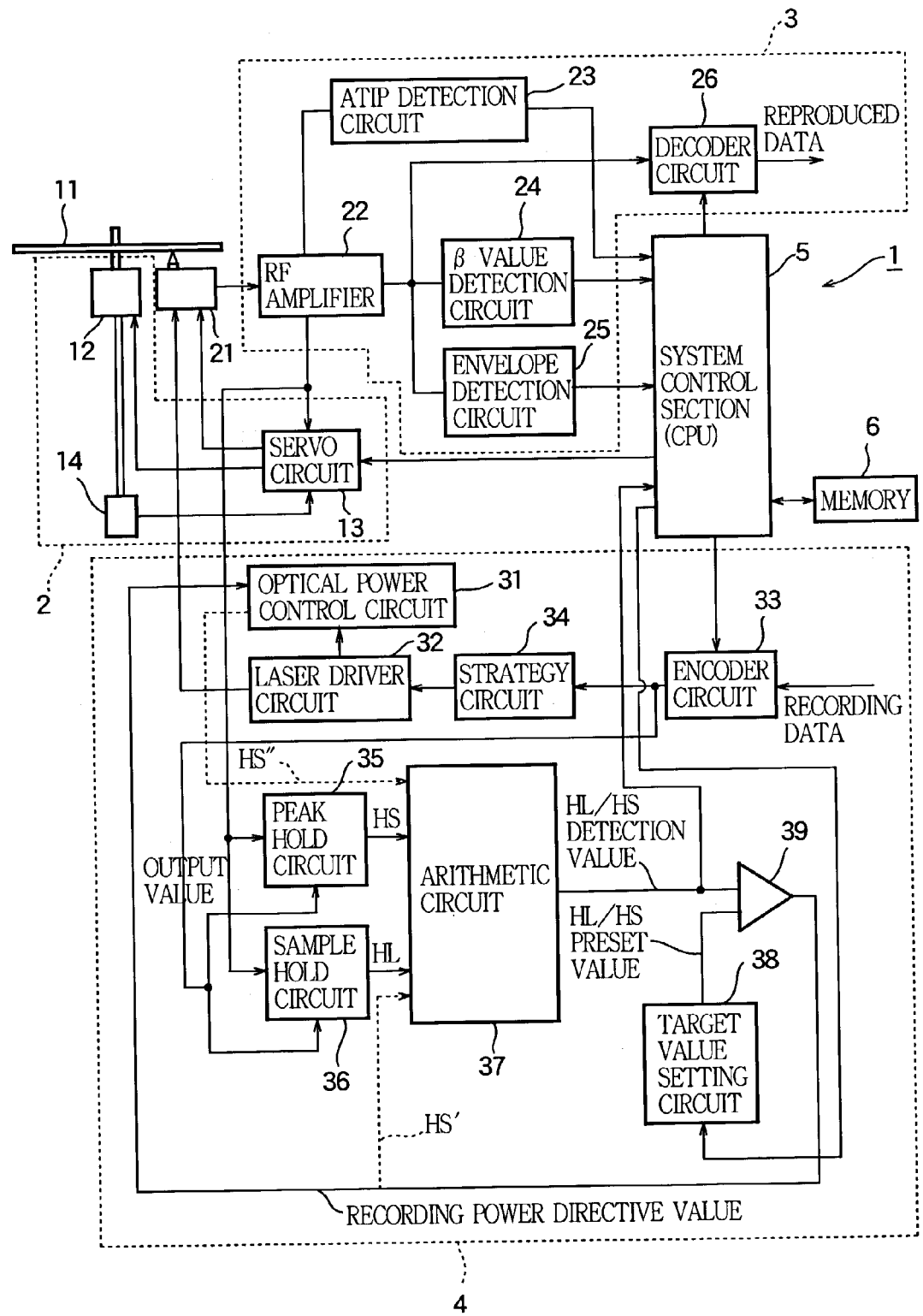
FIG. 5 is a schematic configuration diagram of an optical disk recording apparatus according to the embodiment of the present invention.

The following describes an optical disk recording apparatus for performing the above-mentioned optical disk recording method. FIG. 5 schematically shows a configuration of the optical disk recording apparatus according to the embodiment of the present invention. As shown in FIG. 5, an optical disk recording apparatus 1 comprises a drive section 2, a signal detection and reproduction section 3, a signal recording section 4, a system control section 5 having CPU, and memory 6 as a storage means and machine readable medium for use in the optical disk recording apparatus having the CPU for recording of data on an optical disk at a linear velocity by irradiating a laser beam to form pits while optimally controlling a power of the laser beam based on a value obtained by operation of Optimum Power Control. The drive section 2 comprises a spindle motor 12 as a disk rotation section, a servo circuit 13 as a linear velocity scale setting means, and a frequency generator 14. The signal reproduction section 3 comprises an optical pickup 21 as a means for irradiating and detecting a laser beam, an RF amplifier 22, an ATIP detection circuit 23 as an identification information detecting section, a β value detection circuit 24, an envelope detection circuit 25, and a decoder circuit 26. The signal recording section 4 as a laser beam power controlling section comprises an optical power control circuit 31, a laser driver circuit 32, an encoder circuit 33, a strategy circuit 34, a peak hold circuit 35 as a peak value detecting section, a sample hold circuit 36 as a stable value detecting section, an arithmetic circuit 37 as an formulating section, a comparison circuit 38 as a laser beam power controlling section, and a target value setting circuit 39.

The spindle motor 12 rotatively drives the optical disk 11. The servo circuit 13 controls revolutions of the spindle motor 12 and controls focusing, tracking, and feeding of the optical pickup 21. The frequency generator 14 detects the number of rotations of the spindle motor 12.

The optical pickup 21 includes a light emitting section to irradiate a laser beam to the optical disk 11 and a light receiving section to receive reflected light of the laser beam irradiated to the optical disk 11, and records and reproduces information. The RF amplifier 22 amplifies a return light receiving signal (EFM signal) from the optical pickup 21. The ATIP detection circuit 23 extracts wobble signal components from the EFM signal and decodes ATIP information contained in the wobble signal components. The ATIP information includes time information (address information) at each position and identification information (disk ID) indicating disk types. Conventionally, the lead-in area contains the identification information (disk ID) indicating disk types. Since optical disk types have increased, the lead-out area may also contain the identification information indicating the disk types.

The β value detection circuit 24 computes a β value (asymmetry value) as a parameter for the reproduction signal quality from an EFM signal waveform. The envelope detection circuit 25 detects an EFM signal envelope. When the OPC is performed, the envelope detection is used beforehand to detect to which extent in the PMA the EFM signal is recorded. The decoder circuit 26 EFM-demodulates an EFM signal to obtain Reproduced data.

The optical power control circuit 31 controls the laser driver circuit 32 to control laser beam power when data is recorded and reproduced. The laser driver circuit 32 drives a laser light source in the optical pickup 21. The encoder circuit 33 EFM-modulates recording data. The strategy circuit 34 corrects the time axis of EFM-data modulated by the encoder circuit 33 to form a modulated laser drive signal for the laser driver circuit 32.

The peak hold circuit 35 detects a peak value HS for the reflected light power from the optical disk 11 to which a recording laser beam starts being irradiated to form a pit. As the reflected light's peak value HS, the peak hold circuit 35 detects a peak value within a specified period after the recording signal rises. Since the above-mentioned peak value HS is approximately proportional to the irradiation power (recording power) and the disk reflectance, the peak value HS of the reflected light power is approximately proportional to the recording power. Accordingly, the recording power value is equivalent to the peak value HS of the reflected light power and can be used instead of using that peak value HS. As the recording power value, it is also possible to use the directive value (HS') or the detected value (HS") for the recording power.

The sample hold circuit 36 detects a stable value HL for the reflected light power when this power passes the peak value and becomes an almost stable state after the recording laser beam starts being irradiated. The reflected light power's stable value HL is equivalent to a reflected light power value immediately before the recording signal falls or to a reflected light power value at a given timing after the recording signal rises and the reflected light power is expected to almost become stable. Alternatively, it is also possible to actually detect changing states of the reflected light power, and detect and use a reflected light power value after detection of a stable state in some degree.

The arithmetic circuit 37 is used to find the power ratio of stable value to peak value HL/HS expressed in terms of a ratio of the reflected light power's stable value HL to its peak value HS. The target value setting circuit 38 holds the power ratio of stable value to peak value HL/HS as a target value for performing the running OPC and outputs the target value to the comparison circuit 39. The comparison circuit 39 compares the target value of HL/HS with the observed value thereof and outputs a directive value for the recording power in order to allow the observed value to match the target value. In other words, the comparison circuit 39 outputs a directive value so as to increase the recording power as the observed value for HL/HS becomes larger than its target value, i.e., as a depth becomes shallower than the optimal pit depth.

Figure 6:
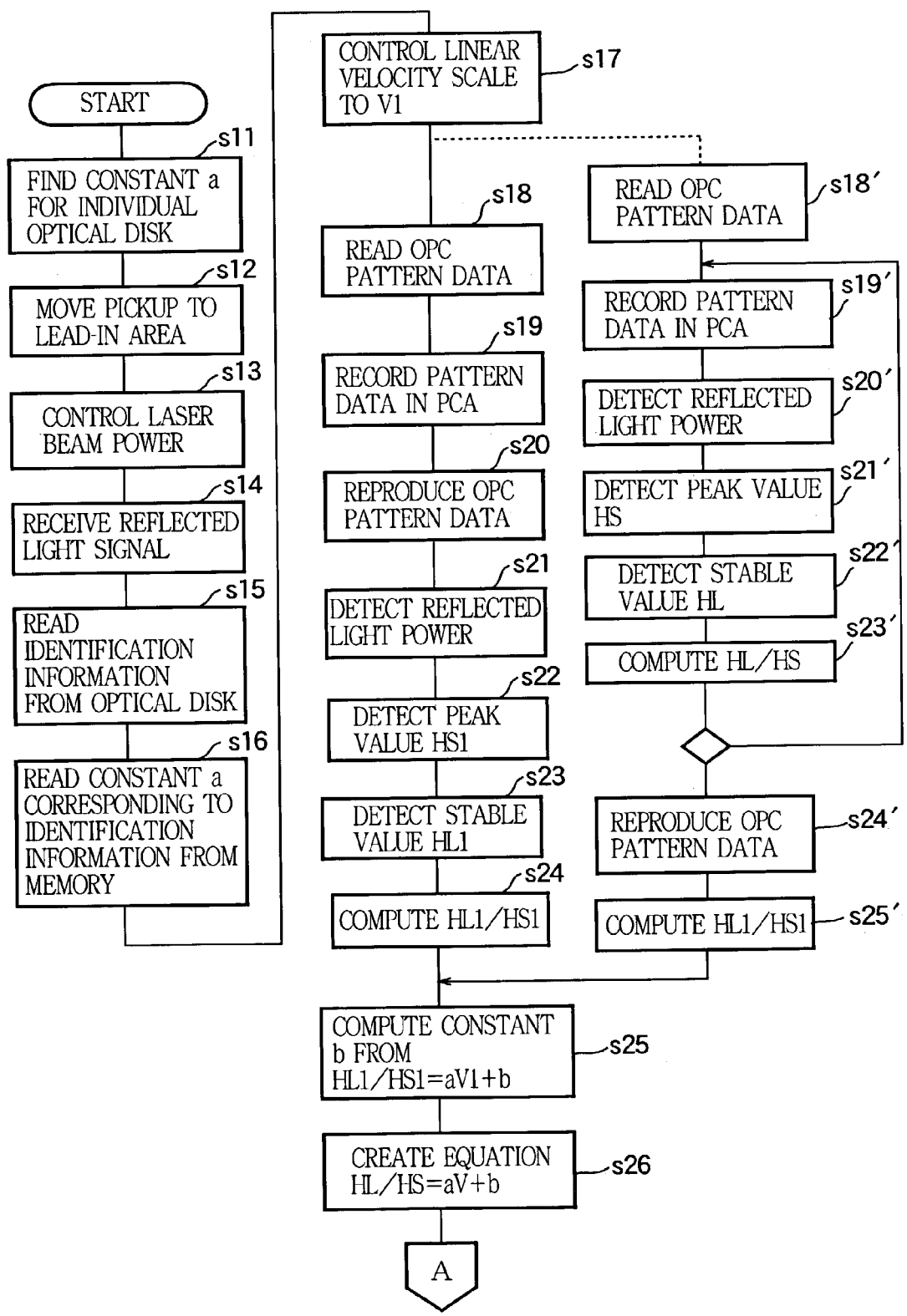
FIG. 6 is a flowchart for explaining an operation of an inventive optical disk recording apparatus.
Figure 7:
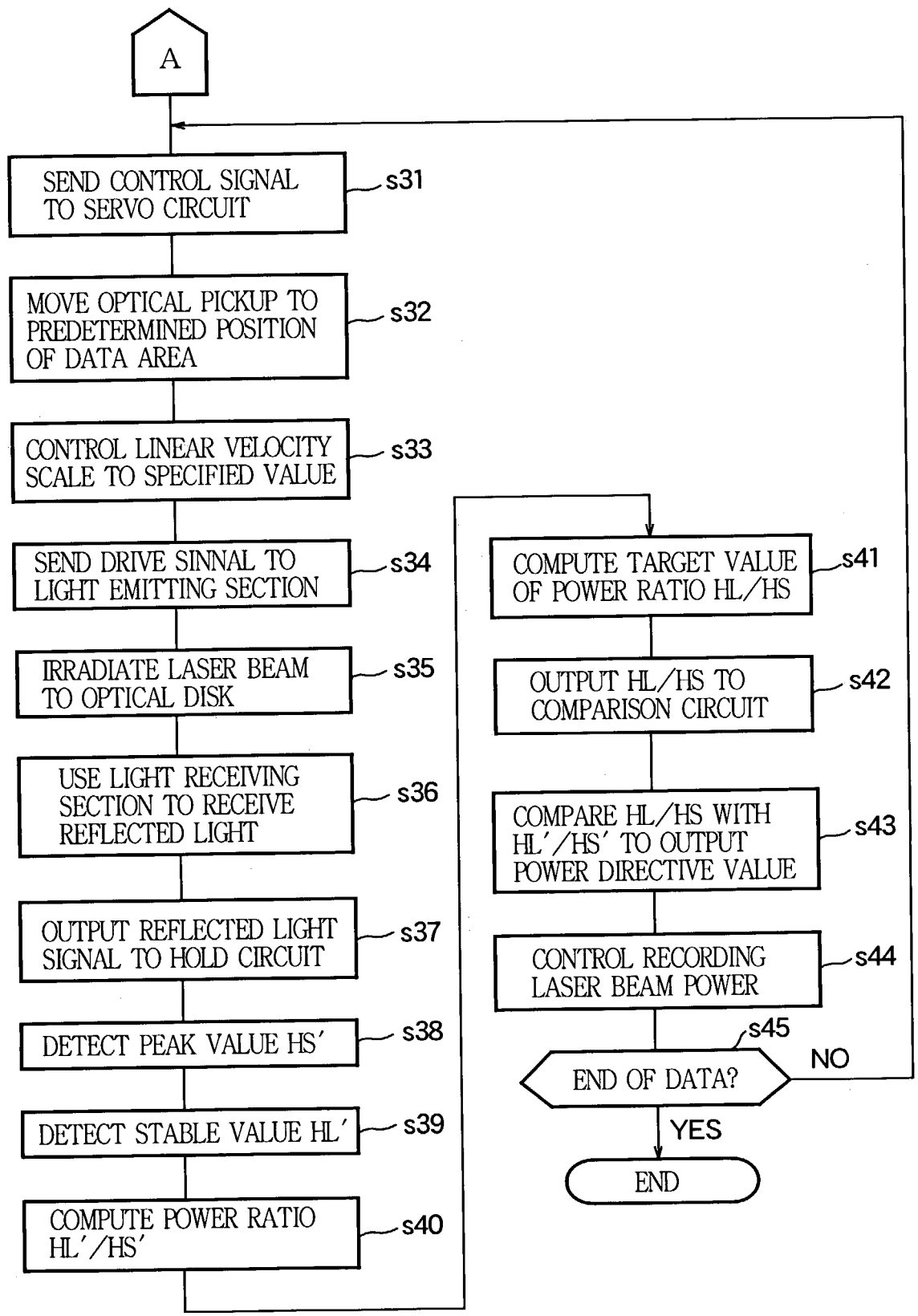
FIG. 7 is a flowchart for explaining the operation of the inventive optical disk recording apparatus.

An operation of the optical disk recording apparatus 1 will now be described. FIGS. 6 and 7 are flowcharts for describing the operation of the optical disk recording apparatus 1. Before the optical disk recording apparatus 1 records data on the optical disk 11, an experiment or the like is conducted to find the value a for each optical disk type. The value a needs to satisfy the relational expression $$HL/HS = aV + b$$

between the linear velocity scale V and the power ratio of stable value to peak value HL/HS that is a target value for the running OPC. These values are stored in the memory 6 of the optical disk recording apparatus 1 (s11).

The system control section 5 then sends a control signal to the servo circuit 13 to control the optical pickup 21 to be positioned against the lead-in area via the servo circuit 13 (s12). The system control section 5 outputs a given signal to the encoder circuit 33 for recording specified pattern data in the PMA. This signal is sent to the laser driver circuit 32 via the encoder circuit 33 and the strategy circuit 34. The laser driver circuit 32 controls the laser beam power generated from the light emitting section (s13).

The reflected light signal received in the light receiving section of the optical pickup 21 is amplified in the RF amplifier 22 and is sent to the ATIP detection circuit 23 (s14). The optical disk identification information may be recorded in the lead-in area and the lead-out area. The ATIP detection circuit 23 reads the optical disk identification information recorded at least in the lead-in area. The identification information is sent to the system control section 5 (s15). The system control section 5 reads the coefficient a corresponding to this identification information from the memory 6 (s16).

The system control section 5 then sends a control signal to the servo circuit 13 to control revolutions of the spindle motor 12 so that the linear velocity scale of the optical disk 11 reaches the specified linear velocity scale V1. Further, the system control section 5 sends a control signal to the servo circuit 13 to control the optical pickup 21 to be positioned against the PCA via the servo circuit 13 (s17). The system control section 5 performs the OPC with a specified linear velocity scale V1 on the optical disk 11 where data is to be recorded (s18). That is to say, the system control section 5 reads the specified pattern data from the memory 6, uses the encoder circuit 33 to encode the pattern data, and sends the pattern data to the laser driver circuit 32 via the strategy circuit 34.

Based on the pattern data, the laser driver circuit 32 controls the light emitting section of the optical pickup 21 to record the pattern data for OPC in a PCA test area on the optical disk 11 (s19). The recorded pattern data is reproduced to determine an optimal power (s20). The determined optimal power is used for recording in a PCA count area. At this time, the light receiving section of the optical pickup 21 detects a signal corresponding to the reflected light power value for the recording laser beam. This signal is sent to the peak hold circuit 35 and the sample hold circuit 36 via the RF amplifier 22 (s21).

The peak hold circuit 35 detects the peak value HS1 for the reflected light power of the recording laser beam at the beginning of irradiation and outputs the peak value to the arithmetic circuit 37 (s22). The sample hold circuit 36 detects the stable value HL1 for the reflected light power of the recording laser beam in an almost stable state after that peak value HS1. Based on the data supplied from the peak hold circuit 35 and the sample hold circuit 36, the arithmetic circuit 37 computes the power ratio of stable value to peak value HL1/HS1 for the recording laser beam and sends an arithmetic result to the system control section 5 (s24).

The system control section 5 finds an intercept value b satisfying the operational expression $$HL1/HS1 = aV1 + b$$

using a first linear velocity scale V1 for performing the OPC, the coefficient a corresponding to the identification information for the optical disk 11, and the power ratio of stable value to peak value HL1/HS1 for the recording laser beam sent from the arithmetic circuit 37 (s25).

The system control section 5 uses the coefficient a and the intercept value b to create and maintain the relational expression $$HL/HS = aV + b \qquad \text{Eq. 1}$$

between any linear velocity scale V during execution of the running OPC and the power ratio of stable light to peak light HL/HS as a target value (s26).

The system control section 5 then sends a control signal to the servo circuit 13 to record data in a program area on the optical disk 11 (s31). The servo circuit 13 sends a specified drive signal to the optical pickup 21 which then moves to a position against the program area on the optical disk 11 (s32). The optical pickup 21 moves to positions accordingly against the program area during data recording. The servo circuit 13 sends a control signal to the spindle motor 12 to rotate it so as to achieve the linear velocity scale corresponding to a data value written by the optical pickup 21 (s33). The recorded data is input to the encoder circuit 33 which encodes the data. The strategy circuit 34 corrects the time axis. The laser driver circuit 32 sends a drive signal to the light emitting section of the optical pickup 21 (s34).

The optical pickup 21 irradiates a laser beam corresponding to the recorded data onto the optical disk to form a pit (s35). At this time, the light receiving section of the optical pickup 21 receives reflected light corresponding to the laser beam irradiated to the optical disk 11 (s36). The reflected light received by the optical pickup 21 is amplified by the RF amplifier 22 and is output to the peak hold circuit 35 and the sample hold circuit 36 (s37).

The peak hold circuit 35 detects a peak value $HS_x$ for the reflected light power of the recording laser beam at the beginning of irradiation (s38). The sample hold circuit 36 detects a stable value $HL_x$ for the reflected light power of the recording laser beam in an almost stable state after that peak value HS and outputs the value to the arithmetic circuit 37 (s39).

Based on the data supplied from the peak hold circuit 35 and the sample hold circuit 36, the arithmetic circuit 37 computes a power ratio of stable value to peak value $HL_x/HS_x$ for the recording laser beam and sends a result to the comparison circuit 39 (s40). Based on the relational expression (Eq. 1), the system control section 5 computes a target value for performing the running OPC with any linear velocity scale V, i.e., the power ratio of stable value to peak value HL/HS for the reflected light of the recording laser beam, and outputs the target value to the target value setting circuit 38 (s41). The target value setting circuit 38 outputs the power ratio of stable value to peak value HL/HS for the reflected light to the comparison circuit 39 (s42). The comparison circuit 39 compares the target value with the observed value in terms of the power ratio of stable value to peak value for the reflected light of the recording laser beam to find a difference. The comparison circuit 39 then outputs a recording power instruction value corresponding to the difference to the optical power control circuit 31 (s43). The optical power control circuit 31 controls the laser driver circuit 32 with the recording power instruction value to control the power of a recording laser beam emitted from the optical pickup 21 (s44).

The system control section 5 repeats the steps S31 through S45 while the data to be recorded on the optical disk run, or terminates the process when the data to be recorded on the disk run out (s45).

As an alternative to steps s18 through s23, it may be preferable to conduct a procedure from steps s18' to s23' shown below. In other words, the system control section 5 performs the OPC with a specified linear velocity scale V1 on the optical disk 11 where data is to be recorded (s18'). The system control section 5 reads specified pattern data from the memory, e.g., pattern data for changing the laser recording power in 15 levels. The pattern data is encoded in the encoder circuit 33 and is sent to the laser driver circuit 32 via the strategy circuit 34.

Based on the pattern data, the laser driver circuit 32 controls the light emitting section of the optical pickup 21 and records the pattern data for changing the laser recording power in 15 levels in a PCA test area on the optical disk 11 (s19'). The light receiving section of the optical pickup 21 detects a signal corresponding to the reflected light power value for the recording laser beam. This signal is sent to the peak hold circuit 35 and the sample hold circuit 36 via the RF amplifier 22 (s20').

The peak hold circuit 35 detects the peak value HS1 for the reflected light power of the recording laser beam when the recording power magnitude is changed in 15 levels, and outputs the peak value to the arithmetic circuit 37 (s21'). The sample hold circuit 36 detects the stable value HL for the reflected light power of the recording laser beam in an almost stable state after that peak value HS when the recording power magnitude is changed in 15 levels, and outputs the stable value to the arithmetic circuit 37 (s22'). Based on the values supplied from the peak hold circuit 35 and the sample hold circuit 36, the arithmetic circuit 37 computes the power ratio of stable value to peak value HL/HS for each recording power magnitude, and transmits an arithmetic result to the system control section 5 (s23'). After these steps are repeated for 15 levels, the recorded pattern data is reproduced to determine an optimal power (s24'). From the determined optimal power and the computed HL/HS values, the system control section 5 computes the relationship between the recording laser beam power and the power ratio of stable value to peak value HL/HS for the recording laser beam. The system control section 5 also computes the relationship between the recording laser beam power and β. Based on the two computed relationships, the system control section 5 finds the power ratio of stable value to peak value HL1/HS1 for the recording laser beam when β is optimal (s25'). Thereafter, recording in the PCA count area takes place, but the description thereof is omitted.

Second Embodiment

The optical disk recording method according to the second embodiment of the present invention will now be described. As mentioned above, the PCA as an area for OPC is conventionally provided only on the inside periphery side of the lead-in area. Since the optical disk's recording speed continues to increase, it is expected to standardize the OPC also on the outside periphery side of the optical disk. The second embodiment describes the optical disk recording method and the optical disk recording apparatus that can provide the following feature. That is to say, the OPC is performed on the inside and outside periphery sides of the optical disk to find a relational expression between the linear velocity scale (recording speed) and the power ratio of stable light to peak light HL/HS as a target value for the running OPC. This enables the CAV method to stably record data.

An area, if specified in the standard, may be used as the PCA for performing the OPC on the outer periphery side. Until the standardization, it is possible to use an area at the outermost periphery on the optical disk for this purpose. As mentioned above (see FIG. 11), the optical disk is 120 mm in diameter. Data can be recorded up to 118 mm in diameter on the outside periphery side of the lead-out area. When the outside periphery of the lead-out area forms an area capable of recording data, it is a good practice to perform the OPC in the outermost periphery area. If the outermost periphery area does not form an area capable of recording data, it is possible to configure the OPC to be performed on the outer periphery side in an area capable of forming the lead-out area, e.g., in an area between 116 and 118 mm in diameter.

The inventor made experiments on a plurality of write once optical disks and erasable optical disks and collected data in order to investigate the relationship between the linear velocity scale and the power ratio of stable light to peak light HL/HS (ROPCRef) when the OPC is performed in the PCA provided on the inside and outside periphery sides of the optical disk.

The inventor obtained the same result as for the first embodiment by performing the OPC with a low linear velocity scale in the PCA on the inside periphery and performing the OPC with a high linear velocity scale in the PCA on the outside periphery. That is to say:

1. Linear approximation can be used to represent the relationship between the linear velocity scale (recording speed) V and the power ratio of stable light to peak light HL/HS on each optical disk. That is to say, a linear function can be used to formulate a relational expression between the linear velocity scale V and the power ratio of stable light to peak light HL/HS.

2. The linear function gradient depends on an optical disk type.

3. An optical disk of the same type disks from a different lot reveals the different intercept value for the linear function, but maintains almost the same gradient value.

4. It is possible to successfully reproduce data that is recorded by controlling the laser beam power during data recording based on the relationship in paragraph 1 above.

For example, the OPC was performed with the linear velocity scale of 16 on the inside periphery to find the power ratio of stable light to peak light HL1/HS1. The OPC was performed with the linear velocity scale of 32 on the outside periphery to find the power ratio of stable light to peak light HL2/HS2. As a result, we obtained the linear function for each optical disk as shown in FIG. 3.

Further, by using the data obtained by performing the OPC on the inside and outside periphery sides, we could obtain a relational expression for each optical disk without beforehand finding the constant (coefficient) a for the linear function by means of an experiment or the like as practiced in the first embodiment.

Figure 8:
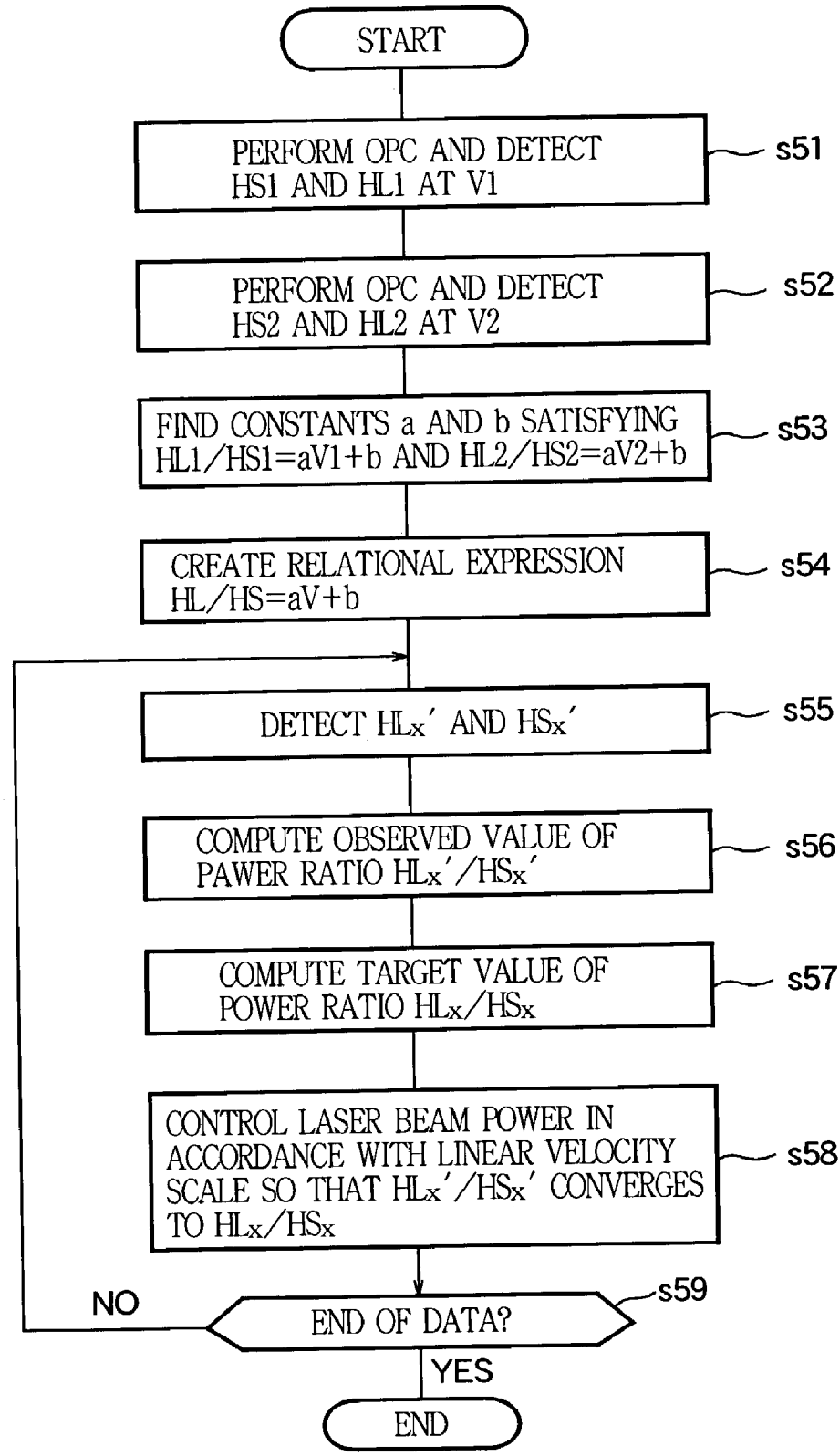
FIG. 8 is a flowchart for explaining an optical disk recording method according to a second embodiment of the present invention.

FIG. 8 is a flowchart explaining the optical disk recording method according to the second embodiment of the present invention. Based on the above-mentioned results, like the first embodiment, the second embodiment of the present invention can use the CAV method to successfully record data on write once optical disks and erasable optical disks with an optimal power value by conducting the following optical disk recording method:

1. Perform the OPC in a first test write area on an optical disk for recording data using a first linear velocity scale V1 to detect a first peak value or equivalent value HS1 for the reflected light power of a recording laser beam at the beginning of irradiation and to detect a first stable value or equivalent value HL1 for the reflected light power of the recording laser beam in an almost stable state after that peak value (s51).

2. Perform the OPC in a second test write area on the optical disk for recording data using a second linear velocity scale V2 to detect a second peak value or equivalent value HS2 for the reflected light power of the recording laser beam at the beginning of irradiation and to detect a second stable value or equivalent value HL2 for the reflected light power of the recording laser beam in an almost stable state after that peak value (s52).

3. Using the first power ratio of stable light to peak light HL1/HS1 represented as a ratio of the detected HL1 to HS1 and the first linear velocity scale V1 detected in paragraph 1; and the second power ratio of stable light to peak light HL2/HS2 represented as a ratio of the detected HL2 to HS2 and the second linear velocity scale V2 detected in paragraph 2, find a coefficient value 1 and an intercept value b to satisfy the following operational expressions (s53):

$$HL1/HS1=aV1+b$$

$$HL2/HS2=aV2+b$$

4. Use the gradient coefficient value a and the intercept value b obtained in paragraph 3 to create the following relational expression between any linear velocity scale V and the power ratio of stable light to peak light HL/HS as a target value during execution of the running OPC (s54).

$$HL/HS=aV+b \qquad \text{Eq. 2}$$

5. Perform the running OPC with any linear velocity scale $V_x$ when recording data on the optical disk to detect an observed value $HL_x'$ as the peak value for the reflected light power of a recording laser beam and an observed value $HS_x'$ as the stable value for the reflected light power of the recording laser beam in an almost stable state after that peak value (s55).

6. Compute the power ratio of stable light to peak light $HL_x'/HS_x'$ as the ratio of the detected stable value to the detected peak value (s56).

7. According to the above-mentioned relational expression (Eq. 2), compute the power ratio of stable light to peak light $HL_x/HS_x$ when the linear velocity scale is $V_x$ (s57).

8. Control the recording power value of the recording laser beam according to the linear velocity scale so that the observed value $HL_x'/HS_x'$ for the power ratio of stable light to peak light becomes the target value $HL_x/HS_x$ computed by the above-mentioned relational expression (s58).

9. Repeat the steps S55 through S58 while the data to be recorded on the optical disk run, or terminate the process when the data to be recorded on the optical disk run out (s59).

The following describes an optical disk recording apparatus for performing the above-mentioned optical disk recording method. The optical disk recording apparatus according to the second embodiment of the present invention can be implemented by using the optical disk recording apparatus 1 in FIG. 4. Accordingly, here is omitted a description about the schematic configuration of the optical disk recording apparatus according to the second embodiment of the present invention.

Figure 9:
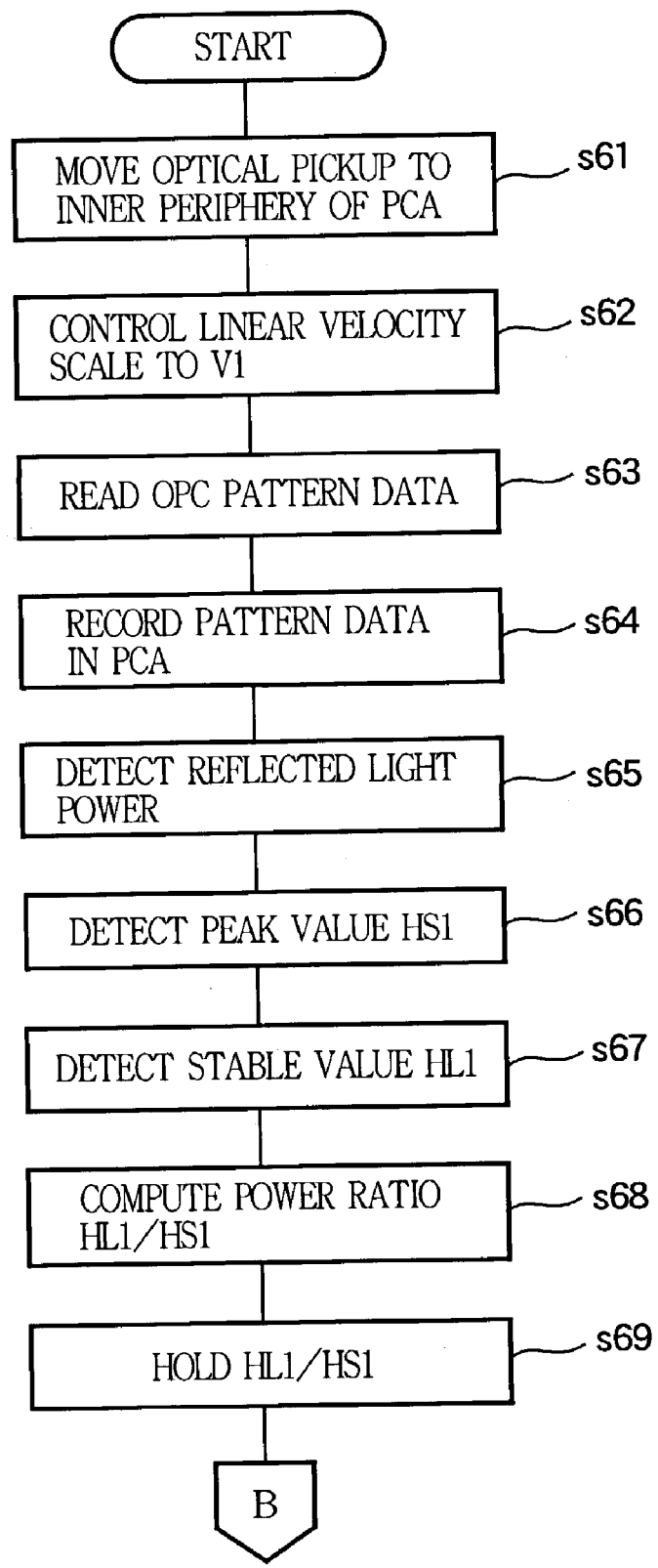
FIG. 9 is a flowchart for explaining an operation of an optical disk recording apparatus according to the second embodiment of the present invention.
Figure 10:
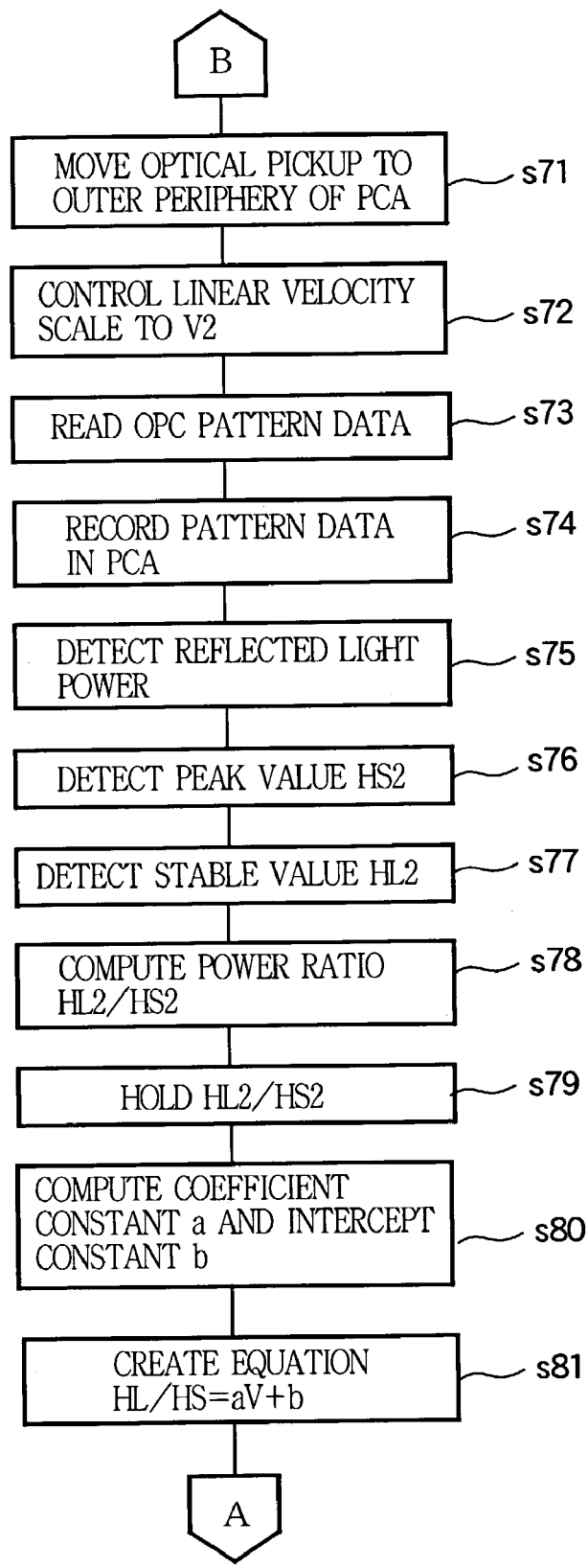
FIG. 10 is a flowchart for explaining the operation of an optical disk recording apparatus according to the second embodiment of the present invention.

The following describes an operation of the optical disk recording apparatus 1 according to the second embodiment of the present invention. FIGS. 9 and 10 are flowcharts for describing the operation of the optical disk recording apparatus according to the second embodiment of the present invention. The optical disk recording method according to the second embodiment of the present invention differs from that according to the first embodiment thereof in the method of computing a relational expression representing the relationship between the linear velocity scale V and the power ratio of stable light to peak light HL/HS as a target value. The first and second embodiments use the same procedure for computing the target value for the running OPC by using the computed relational expression. The following, describes only differences from the optical disk recording method according to the first embodiment.

When the optical disk recording apparatus 1 records data on the optical disk 11, the system control section 5 first sends a control signal to the servo circuit 13. Via the servo circuit 13, the system control section 5 controls the optical pickup 21 so that it is positioned to the first test write area on the optical disk 11 for recording data, e.g., to the PCA on the inside periphery side (s61). The system control section 5 then sends a control signal to the servo circuit 13 to control revolutions of the spindle motor 12 via the servo circuit 13 so that the linear velocity scale of the optical disk 11 reaches the first linear velocity scale V1 (s62). The system control section 5 performs the OPC with the first linear velocity scale V1 in the PCA on the inside periphery side of the optical disk 11 where data is to be recorded (s63). That is to say, the system control section 5 reads specified pattern data from the memory 6, uses the encoder circuit 33 to encode the pattern data, and sends the pattern data to the laser driver circuit 32 via the strategy circuit 34. Based on the pattern data, the laser driver circuit 32 controls the light emitting section of the optical pickup 21 to record the pattern data for OPC in the PCA on the inside periphery of the optical disk 11 (s64). The light receiving section of the optical pickup 21 detects a signal corresponding to the reflected light power value for the recording laser beam. This signal is sent to the peak hold circuit 35 and the sample hold circuit 36 via the RF amplifier 22 (s65).

The peak hold circuit 35 detects a first peak value HS1 for the reflected light power of the recording laser beam at the beginning of irradiation and outputs that first peak value to the arithmetic circuit 37 (s66). The sample hold circuit 36 detects a first stable value HL1 for the reflected light power of the recording laser beam in an almost stable state after the first peak value HS1 and outputs that first stable value to the arithmetic circuit 37 (s67). Based on the data supplied from the peak hold circuit 35 and the sample hold circuit 36, the arithmetic circuit 37 computes a first power ratio of stable value to peak value HL1/HS1 for the recording laser beam and sends an arithmetic result to the system control section 5 (s68).

The system control section 5 stores the arithmetic result sent from the arithmetic circuit 37, i.e., the first power ratio of stable value to peak value HL1/HS1 for the recording laser beam in the memory 6 or retains in itself (s69).

Likewise, the system control section 5 first sends a control signal to the servo circuit 13 to control the optical pickup 21 so that it is positioned to the second test write area on the optical disk 11 for recording data, e.g., to the PCA on the outside periphery side (s71). The system control section 5 then sends a control signal to the servo circuit 13 to control revolutions of the spindle motor 12 via the servo circuit 13 so that the linear velocity scale of the optical disk 11 reaches the second linear velocity scale V2 (s72). The system control section 5 performs the OPC with the second linear velocity scale V2 in the PCA on the outside periphery side of the optical disk 11 where data is to be recorded (s73). That is to say, the system control section 5 reads the specified pattern data from the memory 6, uses the encoder circuit 33 to encode the pattern data, and sends the pattern data to the laser driver circuit 32 via the strategy circuit 34. Based on the pattern data, the laser driver circuit 32 controls the light emitting section of the optical pickup 21 to record the pattern data for OPC in the PCA on the outside periphery of the optical disk 11 (s74). The light receiving section of the optical pickup 21 detects a signal corresponding to the reflected light power value for the recording laser beam. This signal is sent to the peak hold circuit 35 and the sample hold circuit 36 via the RF amplifier 22 (s75).

The peak hold circuit 35 detects a second peak value HS2 for the reflected light power of the recording laser beam at the beginning of irradiation and outputs that second peak value to the arithmetic circuit 37 (s76). The sample hold circuit 36 detects a second stable value HL2 for the reflected light power of the recording laser beam in an almost stable state after the second peak value HS2 and outputs that second stable value to the arithmetic circuit 37 (s77). Based on the data supplied from the peak hold circuit 35 and the sample hold circuit 36, the arithmetic circuit 37 computes a second power ratio of stable value to peak value HL2/HS2 for the recording laser beam and sends an arithmetic result to the system control section 5 (s78).

The system control section 5 stores the arithmetic result sent from the arithmetic circuit 37, i.e., the second power ratio of stable value to peak value HL2/HS2 for the recording laser beam in the memory 6 or retains in itself (s79).

The system control section 5 then finds a coefficient a and an intercept value b satisfying the following operational expressions:

$$HL1/HS1 = aV1 + b$$

$$HL2/HS2 = aV2 + b$$

using the first linear velocity scale V1 for performing the OPC in the PCA as the first test write area on the inside periphery, the first power ratio of stable value to peak value HL1/HS1 for the recording laser beam send from the arithmetic circuit 37, using the second linear velocity scale V2 for performing the OPC in the PCA as the second test write area on the outside periphery, and the second power ratio of stable value to peak value HL2/HS2 for the recording laser beam sent from the arithmetic circuit 37 (s80).

The system control section 5 uses the coefficient a and the intercept value b to create and maintain the relational expression $$HL/HS = aV+b \qquad \text{Eq. 2}$$

between any linear velocity scale $V_x$ during execution of the running OPC and the power ratio of stable light to peak light $HL_x/HS_x$ as a target value (s81).

Subsequently, in the same manner as the first embodiment, steps s31 through s45 in FIG. 7 are performed.

While there has been described data recording on an optical disk using the CAV method, the present invention is not limited thereto. Since the present invention controls the laser beam power for recording by setting a target value for the running OPC in accordance with the linear velocity scale during data recording, the present invention can be applied to the other recording methods. For example, the present invention is applicable to the CLV method for recording data on an optical disk. Further, the present invention is applicable to the Zone CLV method that divides the program area of the optical disk into a plurality of areas and records data with the same linear velocity scale for each area. Moreover, the present invention can be applied to the Partial CAV method that records data using the CAV method in the middle of the program area, then using the CLV method for the remainder thereof.

The present invention is applicable to write once optical disks such as CD-R, CD-RW, DVD-R, etc., and erasable optical disks such as DVD-RW, DVD+RW, DVD-RAM, etc.

The present invention can accurately control the laser beam's recording power despite a change of the linear velocity scale and configure a target value of all available linear velocity scales based on relational expressions. Though the running OPC has been only available with the CLV method conventionally, the present invention enables the CAV method, the Partial CAV method, and the Zone CLV method to perform the running OPC and can record data with an optimal power value and high recording quality.

If the optical disk state changes, the present invention can accurately and safely control the laser beam's recording power.

Further, it becomes possible to control the laser beam's recording power in accordance with write speeds or optical disk states. The present invention eliminates the need for storing a constant that is conventionally predetermined correspondingly to the optical disk's identification information, reducing the memory area.

What is claimed is:

1. A method of recording data on an optical disk by irradiating a laser beam to form pits while optimally controlling a power of the laser beam based on a value obtained by operation of an Optimum Power Control, the method comprising:
    reading disk identification information prerecorded on the optical disk for selecting a constant which relates to the disk identification information;
    performing a test writing operation for the Optimum Power Control at a predetermined linear velocity prior to data recording so as to obtain a test value;
    formulating an equation expressing a target value as a function of a recording linear velocity based on the constant relating to the disk identification information, the predetermined linear velocity and the test value obtained by the test writing operation;
    performing a running operation of the Optimum Power Control by monitoring an actual value while irradiating the laser beam for the recording of data at the recording linear velocity; and
    controlling the power of the laser beam such that the monitored actual value coincides with the target value which is determined by the equation with respect to the recording linear velocity, wherein performing the test writing operation obtains the test value represented by a ratio of a flat level and a peak level of the power both being measured during the test writing operation for the Optimum Power Control, and performing the running operation obtains the actual value represented by a ratio of a flat level and a peak level of the power both being measured during the running operation of the Optimum Power Control, the peak level representing a maximum power of the laser beam reflected back from the optical disk and observed at the beginning of irradiation for forming the pit, and the flat level representing a stable power of the laser beam reflected back from the optical disk and observed after the start of forming the pit.

2. The method according to claim 1, further including determining the target value by the equation anytime the recording linear velocity changes in accordance with a radial position of the laser beam irradiated onto the optical disk.

3. A method of recording data on an optical disk by irradiating a laser beam to form pits while optimally controlling a power of the laser beam based on a value obtained by operation of an Optimum Power Control, the method comprising:
    reading identification information prerecorded on the optical disk for selecting a constant "a" which relates to the disk identification information;
    performing a test writing operation of the Optimum Power Control at a predetermined linear velocity V1 prior to data recording so as to obtain a test value represented by a ratio of a flat level HL1 and a peak level HS1 of the power both being measured during the test writing operation for the Optimum Power Control, the peak level HS1 representing a maximum power of the laser beam reflected back from the optical disk and observed at the beginning of irradiation for forming the pit, and the flat level representing a stable power of the laser beam reflected back from the optical disk and observed after the start of forming the pit;
    calculating another constant "b" based on a relation HL1/HS1=a*V1+b using the constant "a" relating to the disk identification information, the predetermined linear velocity V1 and the test value HL1/HS1 obtained by the test writing operation;
    formulating an equation HL/HS=a*V+b, which expresses a target value HL/HS as a function of a recording linear velocity V;
    performing a running operation of the Optimum Power Control to monitor an actual value while irradiating the laser beam for the recording of data at the recording linear velocity V; and
    controlling the power of the laser beam such that the monitored actual value coincides with the target value HL/HS which is computed by the equation HL/HS=a*V+b with respect to the recording linear velocity V.

4. The method according to claim 3, further including determining the target value HL/HS by the equation HL/HS=a*V+b at anytime the recording linear velocity V changes in accordance with a radial position of the laser beam irradiated onto the optical disk.

5. A method of recording data on an optical disk by irradiating a laser beam to form pits while optimally controlling a power of the laser beam based on a value obtained by a test writing operation for an Optimum Power Control, the method comprising:

performing a first test writing operation for the Optimum Power Control at a first linear velocity prior to the recording of data so as to obtain a first test value;

performing a second test writing operation for the Optimum Power Control at a second linear velocity prior to the recording of data so as to obtain a second test value;

formulating an equation expressing a target value as a function of a recording linear velocity based on the first linear velocity, the second linear velocity, the first test value and the second test value;

performing a running operation of the Optimum Power Control by monitoring an actual value while irradiating the laser beam for the recording of data at the recording linear velocity; and controlling the power of the laser beam such that the monitored actual value coincides with the target value which is determined by the equation with respect to the recording linear velocity, wherein performing the first test operation obtains the first test value represented by a ratio of a flat level and a peak level of the power both being measured during the first test writing operation of the Optimum Power Control, performing the second writing test operation obtains the second test value represented by a ratio of a flat level and a peak level of the power both being measured during the second test writing operation of the Optimum Power Control, and performing the running operation obtains the actual value represented by a ratio of a flat level and a peak level of the power both being measured during the running operation of the Optimum Power Control, the peak level representing a maximum power of the laser beam reflected back from the optical disk and observed at the beginning of irradiation for forming the pit, and the flat level representing a stable power of the laser beam reflected back from the optical disk and observed after the start of forming the pit.

6. The method according to claim 5, further including determining the target value by the equation anytime the recording linear velocity changes in accordance with a radial position of the laser beam irradiated onto the optical disk.

7. A method of recording data on an optical disk by irradiating a laser beam to form pits while optimally controlling a power of the laser beam based on a value obtained by operation of an Optimum Power Control, the method comprising:

performing a first test writing operation for the Optimum Power Control at a first linear velocity V1 prior to the recording of data so as to obtain a first test value represented by a ratio of a flat level HL1 and a peak level HS1 of the power both being measured during the first test writing operation for the Optimum Power Control, the peak level representing a maximum power of the laser beam reflected back from the optical disk and observed at the beginning of irradiation for forming the pit, and the flat level representing a stable power of the laser beam reflected back from the optical disk and observed after the start of forming the pit;

performing a second test writing operation for the Optimum Power Control at a second linear velocity V2 prior to the recording of data so as to obtain a second test value represented by a ratio of a flat level HL2 and a peak level HS2 of the power both being measured during the second test writing operation for the Optimum Power Control, calculating constants a and b based on a first relation $HL1/HS1=a*V1+b$ derived from the first test writing operation and a second relation $HL2/HS2=a*V2+b$ derived from the second test writing operation;

formulating an equation $HL/HS=a*V+b$ using the calculated constants a and b, the equation expressing a target value HL/HS as a function of a recording linear velocity V;

performing a running operation of the Optimum Power Control by monitoring an actual value while irradiating the laser beam for the recording of data at the recording linear velocity V; and controlling the power of the laser beam such that the monitored actual value coincides with the target value HL/HS which is determined by the equation $HL/HS=a*V+b$ with respect to the recording linear velocity V.

8. The method according to claim 7, further including determining the target value HL/HS by the equation $HL/HS=a*V+b$ anytime the recording linear velocity V changes in accordance with a radial position of the laser beam irradiated on to the optical disk.

9. An optical recording apparatus comprising:

a rotating section that rotates an optical disk bearing disk identification information thereon;

an irradiating section that irradiates a laser beam onto the rotated optical disk to form pits for recording of data, while a power of the laser beam is optimally controlled based on a value obtained by operation of an Optimum Power Control (OPC);

a detecting section that detects the disk identification information for selecting a constant which relates to the detected disk identification information;

a test OPC section that performs a test writing operation for the Optimum Power Control at a predetermined linear velocity prior to the recording of data so as to obtain a test value;

a formulating section that formulates an equation expressing a target value as a function of a recording linear velocity based on the constant relating to the disk identification information, the predetermined linear velocity and the test value obtained by the Optimum Power Control;

a running OPC section that performs a running operation of the Optimum Power Control by monitoring an actual value while irradiating the laser beam for the recording of data at the recording linear velocity; and a controlling section that controls the power of the laser beam such that the monitored actual value coincides with the target value which is determined by the equation with respect to the recording linear velocity, wherein the test OPC section obtains the test value represented by a ratio of a flat level and a peak level of the power both being measured during the test writing operation for the Optimum Power Control, and the running OPC section obtains the actual value represented by a ratio of a flat level and a peak level of the power both being measured during the running operation of the Optimum Power Control, the peak level representing a maximum power of the laser beam reflected back from the optical disk and observed at the beginning of irradiation for forming the pit, and the flat level representing a stable power of the laser beam reflected back from the optical disk and observed after the start of forming the pit.

10. The optical recording apparatus according to claim 9, further including a changing section that changes the target value determined by the equation anytime the recording linear velocity changes in accordance with a radial position of the laser beam irradiated on to the optical disk.

11. An optical recording apparatus comprising:
a rotating section that rotates an optical disk bearing disk identification information thereon;
an irradiating section that irradiates a laser beam onto the rotated optical disk to form pits for recording of data, while a power of the laser beam is optimally controlled based on a value obtained by operation of an Optimum Power Control (OPC);
a detecting section that detects disk identification information for selecting a constant "a" which relates to the detected disk identification information;
a test OPC section that performs a test writing operation for the Optimum Power Control at a predetermined linear velocity V1 prior to the recording of data so as to obtain a test value represented by a ratio of a flat level HL1 and a peak level HS1 of the power both being measured during the test writing operation of the Optimum Power Control, the peak level HS1 representing a maximum power of the laser beam reflected back from the optical disk and observed at the beginning of irradiation for forming the pit, and the flat level representing a stable power of the laser beam reflected back from the optical disk and observed after the start of forming the pit;
a calculating section that calculates another constant "b" based on a relation HL1/HS1=a*V1+b using the constant "a" relating to the disk identification information, the predetermined linear velocity V1 and the test value HL1/HS1 obtained by the test writing operation;
a formulating section that formulates an equation HL/HS=a*V+b, which expresses a target value HL/HS as a function of a recording linear velocity V;
a running OPC section that performs a running operation of the Optimum Power Control by monitoring an actual value while irradiating the laser beam for the recording of data at the recording linear velocity V; and
a controlling section that controls the power of the laser beam such that the monitored actual value coincides with the target value HL/HS which is computed by the equation HL/HS=a*V+b with respect to the recording linear velocity V.

12. The optical recording apparatus according to claim 11, further including a changing section that changes the target value HL/HS determined by the equation HL/HS=a*V+b anytime the recording linear velocity V changes in accordance with a radial position of the laser beam irradiated onto the optical disk.

13. An optical recording apparatus comprising:
a rotating section that rotates an optical disk;
an irradiating section that irradiates a laser beam onto the rotated optical disk to form pits for recording of data, while a power of the laser beam is optimally controlled based on a value obtained by a test writing operation for an Optimum Power Control (OPC);
a first OPC section that performs a first test writing operation for the Optimum Power Control at a first linear velocity prior to the recording of data so as to obtain a first test value;
a second OPC section that performs a second test writing operation of the Optimum Power Control at a second linear velocity prior to the recording of data so as to obtain a second test value;
a formulating section that formulates an equation expressing a target value as a function of a recording linear velocity based on the first linear velocity, the second linear velocity, the first test value and the second test value;
a running OPC section that performs a running operation of the Optimum Power Control by monitoring an actual value while irradiating the laser beam for the recording of data at the recording linear velocity; and
a controlling section that controls the power of the laser beam such that the monitored actual value coincides with the target value which is determined by the equation with respect to the recording linear velocity, wherein the first OPC section obtains the first test value represented by a ratio of a flat level and a peak level of the power both being measured during the first test writing operation for the Optimum Power Control, the second OPC section obtains the second test value represented by a ratio of a flat level and a peak level of the power both being measured during the second test writing operation for the Optimum Power Control, and the running OPC section obtains the actual value represented by a ratio of a flat level and a peak level of the power both being measured during the running operation of the Optimum Power Control, the peak level representing a maximum power of the laser beam reflected back from the optical disk and observed at the beginning of irradiation for forming the pit, and the flat level representing a stable power of the laser beam reflected back from the optical disk and observed after the start of forming the pit.

14. The optical recording apparatus according to claim 13, further including a changing section that changes the target value determined by the equation anytime the recording linear velocity changes in accordance with a radial position of the laser beam irradiated on to the optical disk.

15. An optical recording apparatus comprising:
a rotating section that rotates an optical disk;
an irradiating section that irradiates a laser beam onto the rotated optical disk to form pits for recording of data, while a power of the laser beam is optimally controlled based on a value obtained by operation of an Optimum Power Control;
a first test OPC section that performs a first test writing operation for the Optimum Power Control at a first linear velocity V1 prior to the recording of data so as to obtain a first test value represented by a ratio of a flat level HL1 and a peak level HS1 of the power both being measured during the first test writing operation for the Optimum Power Control, the peak level representing a maximum power of the laser beam reflected back from the optical disk and observed at the beginning of irradiation for forming the pit, and the flat level representing a stable power of the laser beam reflected back from the optical disk and observed after the start of forming the pit;
a second test OPC section that performs a second test writing operation for the Optimum Power Control at a second linear velocity V2 prior to the recording of data so as to obtain a second test value represented by a ratio of a flat level HL2 and a peak level HS2 of the power both being measured during the second test writing operation for Optimum Power Control, a calculating section that calculates constants a and b based on a first relation $HL1/HS1=a*V1+b$ derived from the first test writing operation and a second relation $HL2/HS2=a*V2+b$ derived from the second test writing operation;

a formulating section that formulates an equation $HL/HS=a*V+b$ using the calculated constants a and b, the equation expressing a target value HL/HS as a function of a recording linear velocity V;

a running OPC section that performs a running operation of the Optimum Power Control by monitoring an actual value while irradiating the laser beam for the recording of data at the recording linear velocity V; and a controlling section that controls the power of the laser beam such that the monitored actual value coincides with the target value HL/HS which is determined by the equation $HL/HS=a*V+b$ with respect to the recording linear velocity V.

16. The optical recording apparatus according to claim 15, further comprising a changing section that changes the target value HL/HS determined by the equation $HL/HS=a*V+b$ anytime the recording linear velocity V changes in accordance with a radial position of the laser beam irradiated onto the optical disk.

17. A machine readable medium having encoded thereon a computer program code for use in an optical recording apparatus having a CPU for recording of data on an optical disk by irradiating a laser beam to form pits while optimally controlling a power of the laser beam based on a value obtained by operation of an Optimum Power Control, the program code being executable by the CPU for causing the optical recording apparatus to perform a method comprising:

reading identification information prerecorded on the optical disk for selecting a constant a which relates to the disk identification information;

performing a test writing operation of the Optimum Power Control at a predetermined linear velocity V1 prior to data recording so as to obtain a test value represented by a ratio of a flat level HL1 and a peak level HS1 of the power both being measured during the test writing operation for the Optimum Power Control, the peak level HS1 representing a maximum power of the laser beam reflected back from the optical disk and observed at the start of irradiating the laser beam, and the flat level representing a stable power of the laser beam reflected back from the optical disk and observed after the start of irradiating the laser beam;

calculating another constant b based on a relation $HL1/HS1=a*V1+b$ using the constant a relating to the disk identification information, the predetermined linear velocity V1 and the test value HL1/HS1 obtained by the test writing operation;

formulating an equation $HL/HS=a*V+b$, which expresses a target value HL/HS as a function of a recording linear velocity V;

performing a running operation of the Optimum Power Control to monitor an actual value while irradiating the laser beam for the recording of data at the recording linear velocity V; and controlling the power of the laser beam such that the monitored actual value coincides with the target value HL/HS which is computed by the equation $HL/HS=a*V+b$ with respect to the recording linear velocity V.

18. A machine readable medium having encoded thereon a computer program code for use in an optical recording apparatus having a CPU for recording of data on an optical disk by irradiating a laser beam to form pits while optimally controlling a power of the laser beam based on a value obtained by operation of an Optimum Power Control, the program code being executable by the CPU for causing the optical recording apparatus to perform a method comprising:

performing a first test writing operation for the Optimum Power Control at a first linear velocity prior to the recording of data so as to obtain a first test value;

performing a second test writing operation for the Optimum Power Control at a second linear velocity prior to the recording of data so as to obtain a second test value;

formulating an equation expressing a target value as a function of a recording linear velocity based on the first linear velocity, the second linear velocity, the first test value and the second test value;

performing a running operation of the Optimum Power Control to monitor an actual value while irradiating the laser beam for the recording of data at the recording linear velocity; and controlling the power of the laser beam such that the monitored actual value coincides with the target value which is determined by the equation with respect to the recording linear velocity, wherein performing the first test operation obtains the first test value represented by a ratio of a flat level and a peak level of the power both being measured during the first test writing operation of the Optimum Power Control, performing the second writing test operation obtains the second test value represented by a ratio of a flat level and a peak level of the power both being measured during the second test writing operation of the Optimum Power Control, and performing the running operation obtains the actual value represented by a ratio of a flat level and a peak level of the power both being measured during the running operation of the Optimum Power Control, the peak level representing a maximum power of the laser beam reflected back from the optical disk and observed at the beginning of irradiation for forming the pit, and the flat level representing a stable power of the laser beam reflected back from the optical disk and observed after the start of forming the pit.

19. A machine readable medium having encoded thereon a computer program code for use in an optical recording apparatus having a CPU for recording of data on an optical disk by irradiating a laser beam to form pits while optimally controlling a power of the laser beam based on a value obtained by operation of an Optimum Power Control, the program code being executable by the CPU for causing the optical recording apparatus to perform a method comprising:

performing a first test writing operation for the Optimum Power Control at a first linear velocity V1 prior to the recording of data so as to obtain a first test value represented by a ratio of a flat level HL1 and a peak level HS1 of the power both being measured during the first test writing operation for the Optimum Power Control, the peak level representing a maximum power of the laser beam reflected back from the optical disk and observed at the start of irradiating the laser beam, and the flat level representing a stable power of the laser beam reflected back from the optical disk and observed after the start of irradiating the laser beam;

performing a second test writing operation for the Optimum Power Control at a second linear velocity V2 prior to the recording of data so as to obtain a second test value represented by a ratio of a flat level HL2 and a peak level HS2 of the power both being measured during the second test writing operation for the Optimum Power Control, calculating constants a and b based on a first relation $HL1/HS1=a*V1+b$ derived from the first test writing operation and a second relation $HL2/HS2=a*V2+b$ derived from the second test writing operation;

formulating an equation $HL/HS=a*V+b$ using the calculated constants a and b, the equation expressing a target value HL/HS as a function of a recording linear velocity V;

performing a running operation of the Optimum Power Control by monitoring an actual value while irradiating the laser beam for the recording of data at the recording linear velocity V; and controlling the power of the laser beam such that the monitored actual value coincides with the target value HL/HS which is determined by the equation $HL/HS=a*V+b$ with respect to the recording linear velocity V.

\* \* \* \* \*